(12) United States Patent
Jung et al.

(10) Patent No.: US 11,697,203 B2
(45) Date of Patent: Jul. 11, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Daekyoung Jung, Suwon-si (KR); Changhan Kim, Suwon-si (KR); Jonghyun Ho, Suwon-si (KR); Minsoo Koo, Suwon-si (KR); Jongrok Lim, Suwon-si (KR); Seowoo Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 339 days.

(21) Appl. No.: 17/014,175

(22) Filed: Sep. 8, 2020

(65) Prior Publication Data

US 2021/0101279 A1  Apr. 8, 2021

(30) Foreign Application Priority Data

Oct. 4, 2019 (KR) .................. 10-2019-0123071

(51) Int. Cl.
*B25J 9/16* (2006.01)

(52) U.S. Cl.
CPC ............. *B25J 9/161* (2013.01); *B25J 9/1605* (2013.01); *B25J 9/1633* (2013.01)

(58) Field of Classification Search
CPC ........ B25J 9/161; B25J 9/1605; B25J 9/1633; B25J 11/0085; B25J 9/1653; B25J 9/1664;
(Continued)

(56) References Cited

U.S. PATENT DOCUMENTS 9,811,074 B1  11/2017  Aichele et al.
9,925,664 B2  3/2018  Takeda
(Continued)

FOREIGN PATENT DOCUMENTS

KR       10-0738052       7/2007
KR    10-2011-0034233       4/2011
(Continued)

OTHER PUBLICATIONS

International Search Report and Written Opinion dated Jan. 13, 2021 in corresponding International Application No. PCT/KR2020/012800.

*Primary Examiner* — Jonathan L Sample
*Assistant Examiner* — Matthew C Gammon
(74) *Attorney, Agent, or Firm* — Nixon & Vanderhye P.C.

(57) ABSTRACT

An electronic apparatus is provided. The electronic apparatus includes a communicator comprising communication circuitry, a memory storing information on an artificial intelligence model, and a processor configured to: obtain a map generated based on sensing data obtained by an external electronic apparatus, simulate driving of the external electronic apparatus on the obtained map based on a plurality of parameter values and obtain driving result data for the plurality of parameter values, train the artificial intelligence model based on the plurality of parameter values and the obtained driving result data and obtain a plurality of parameter values related to driving of the external electronic apparatus, and control the communicator to transmit the plurality of obtained parameter values to the external electronic apparatus.

13 Claims, 21 Drawing Sheets

(58) Field of Classification Search
CPC ... B25J 9/1671; G05D 1/0274; G05D 1/0221; G05D 2201/0203; G05D 1/00; G05D 1/02; G05D 1/021; G05D 2201/00; G05D 2201/0208; G05D 2201/0215; A47L 9/2852; A47L 2201/04; G05B 2219/45098

See application file for complete search history.

(56) References Cited

U.S. PATENT DOCUMENTS

| | | |
|---|---|---|
| 10,168,709 B2 | 1/2019 | Kleiner et al. |
| 11,097,416 B2 | 8/2021 | Kwak et al. |
| 11,151,357 B2 | 10/2021 | Kim et al. |
| 2007/0213874 A1 | 9/2007 | Oumi et al. |
| 2009/0326713 A1* | 12/2009 | Moriya ............ B25J 9/1676 701/25 |
| 2015/0379171 A1 | 12/2015 | Kuwahara |
| 2018/0036883 A1 | 2/2018 | Nishitani et al. |
| 2018/0065249 A1 | 3/2018 | Inoue |
| 2018/0079078 A1 | 3/2018 | Nagatsuka et al. |
| 2018/0133895 A1 | 5/2018 | Kwak et al. |
| 2018/0207801 A1 | 7/2018 | Oyama |
| 2018/0236657 A1 | 8/2018 | Kuwahara et al. |
| 2019/0022864 A1 | 1/2019 | Shimodaira |
| 2019/0039243 A1 | 2/2019 | Takeda |
| 2019/0121365 A1 | 4/2019 | Passot et al. |
| 2020/0380242 A1 | 12/2020 | Kim et al. |
| 2021/0096574 A1 | 4/2021 | Lee et al. |
| 2021/0157327 A1 | 5/2021 | Lee et al. |
| 2021/0165415 A1 | 6/2021 | Lee et al. |
| 2021/0165416 A1 | 6/2021 | Lee et al. |
| 2021/0330163 A1* | 10/2021 | Kim .................. A47L 11/4061 |
| 2021/0360849 A1 | 11/2021 | Yu et al. |

FOREIGN PATENT DOCUMENTS

| | | |
|---|---|---|
| KR | 10-1103586 | 1/2012 |
| KR | 10-2012-0116606 | 10/2012 |
| KR | 10-1487784 | 1/2015 |
| KR | 10-1515496 | 5/2015 |
| KR | 10-2018-0055571 | 5/2018 |
| KR | 10-2018-0058303 | 6/2018 |
| KR | 10-2254138 | 5/2021 |
| KR | 10-2272676 | 6/2021 |
| WO | 2008/078890 | 7/2008 |

\* cited by examiner

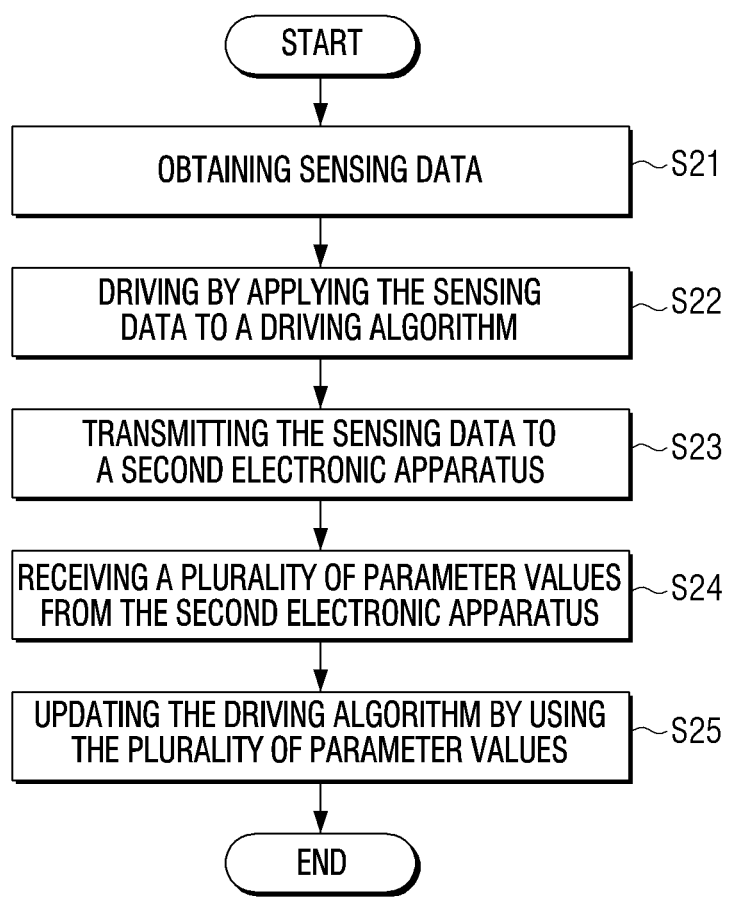

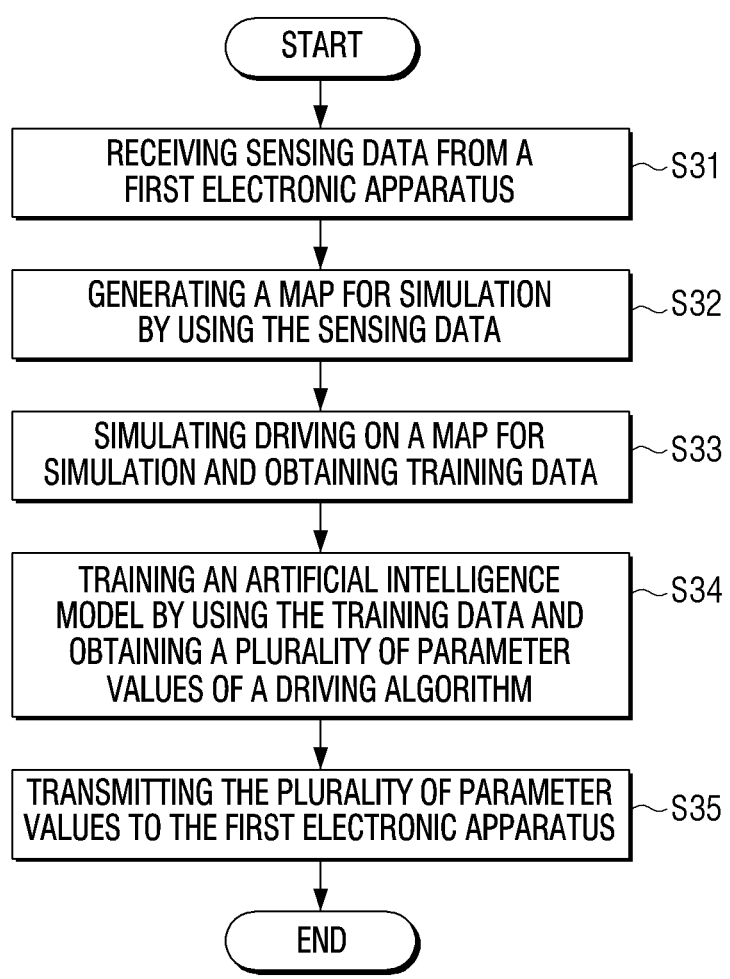

100

ELECTRONIC APPARATUS AND CONTROLLING METHOD THEREOF

CROSS-REFERENCE TO RELATED APPLICATION

This application is based on and claims priority under 35 U.S.C. § 119 to Korean Patent Application No. 10-2019-0123071, filed on Oct. 4, 2019 in the Korean Intellectual Property Office, the disclosure of which is incorporated by reference herein in its entirety.

BACKGROUND

1. Field

The disclosure relates to an electronic apparatus and a controlling method thereof, and for example, to an electronic apparatus for updating a driving algorithm of an external electronic apparatus, and a controlling method thereof.

2. Description of Related Art

Robots may refer, for example, to machines in various forms having capacity to perform work functions by themselves. Robots may detect the surrounding environment in real time based on a sensor, a camera, etc., collect information, and run autonomously, other than simple repetitive functions.

Such robots are currently being used in many fields, and in the case of homes, robot cleaners are being used a lot.

A robot cleaner is an apparatus that automatically cleans an area to be cleaned by suctioning foreign substances while running by itself, without a separate manipulation by a user.

In this case, a robot cleaner detects the location and distance, etc. of an obstacle at a sensor provided in the robot cleaner, determines the moving speed and proceeding direction, etc. by applying a driving algorithm to the detection result, and runs accordingly.

Meanwhile, as parameter values of various parameters of a driving algorithm related to driving are not set based on a place (e.g., a home) wherein a robot cleaner actually runs, a robot cleaner is not performing driving optimized for an actual driving environment.

Accordingly, there is a demand for search of a method for improving the driving performance of a robot cleaner by updating a driving algorithm of a robot cleaner.

SUMMARY

Embodiments of the disclosure provide an electronic apparatus that updates a driving algorithm of an external electronic apparatus in consideration of the actual driving environment of the external electronic apparatus, and a controlling method thereof.

An electronic apparatus according to an example embodiment of the disclosure includes: a communicator comprising communication circuitry, a memory storing information on an artificial intelligence model, and a processor configured to: obtain a map generated based on sensing data obtained by an external electronic apparatus, simulate driving of the external electronic apparatus on the obtained map based on a plurality of parameter values and obtain driving result data for the plurality of parameter values, train the artificial intelligence model based on the plurality of parameter values and the obtained driving result data and obtain a plurality of parameter values related to driving of the external electronic apparatus, and control the communicator to transmit the plurality of obtained parameter values to the external electronic apparatus.

The sensing data obtained by the external electronic apparatus may be data that the external electronic apparatus obtained while running in a specific place, and the processor may, based on the sensing data being received from the external electronic apparatus through the communicator, generate the map corresponding to the specific place based on the received sensing data.

The processor may, based on information on the driving algorithm of the external electronic apparatus being received from the external electronic apparatus through the communicator, identify a plurality of parameters of the driving algorithm, and simulate driving of the external electronic apparatus on the obtained map based on a plurality of parameter values of the plurality of identified parameters.

The processor may simulate driving of the external electronic apparatus on the obtained map based on a plurality of parameter sets respectively including a plurality of parameter values, and obtain driving result data for each parameter set, and train the artificial intelligence model based on the plurality of parameter sets and the obtained driving result data and obtain a plurality of parameter values related to driving of the external electronic apparatus. The plurality of parameter sets may include a first parameter set and a second parameter set wherein parameter values of at least one parameter are different.

The artificial intelligence model may include a plurality of neural network layers, and in the plurality of neural network layers, weights included in each of the plurality of neural network layers may be trained based on the plurality of parameter sets and driving result data obtained for each of the plurality of parameter sets. The processor may acquire a plurality of parameters related to driving of the external electronic apparatus from an input layer among the plurality of neural network layers as the weights are trained.

The driving result data may include at least one of the size of an area that an object corresponding to the external electronic apparatus ran per unit time on the obtained map, the size of an area that the object corresponding to the external electronic apparatus repeatedly ran on the obtained map, or the time that was taken for the object corresponding to the external electronic apparatus to run an area of a predetermined size on the obtained map.

The sensing data obtained by the external electronic apparatus may be applied to the driving algorithm of the external electronic apparatus controlling the driving of the external electronic apparatus, and the processor may transmit the plurality of obtained parameter values to the external electronic apparatus through the communicator for updating the plurality of parameter values of the driving algorithm.

The processor may simulate driving of an object corresponding to the external electronic apparatus on the obtained map through a simulator stored in the memory and obtain the driving result data.

A method for controlling an electronic apparatus according to an example embodiment of the disclosure includes: obtaining a map generated based on sensing data obtained by an external electronic apparatus, simulating driving of the external electronic apparatus on the obtained map based on a plurality of parameter values and obtaining driving result data for the plurality of parameter values, training the artificial intelligence model based on the plurality of parameter values and the obtained driving result data and obtaining a plurality of parameter values related to driving of the external electronic apparatus, and transmitting the plurality of obtained parameter values to the external electronic apparatus.

The sensing data obtained by the external electronic apparatus is data that the external electronic apparatus obtained while running in a specific place, and in the step of obtaining a map, based on the sensing data being received from the external electronic apparatus, the map corresponding to the specific place may be generated based on the received sensing data.

In the obtaining of driving result data, based on information on the driving algorithm of the external electronic apparatus being received from the external electronic apparatus, a plurality of parameters of the driving algorithm may be identified, and driving of the external electronic apparatus may be simulated on the obtained map based on a plurality of parameter values of the plurality of identified parameters.

In the obtaining of driving result data, driving of the external electronic apparatus may be simulated on the obtained map based on a plurality of parameter sets respectively including a plurality of parameter values, and driving result data for each parameter set may be obtained, and the artificial intelligence model may be trained based on the plurality of parameter sets and the obtained driving result data and a plurality of parameter values related to driving of the external electronic apparatus may be obtained. Further, the plurality of parameter sets may include a first parameter set and a second parameter set wherein parameter values of at least one parameter are different.

The artificial intelligence model may include a plurality of neural network layers, and in the plurality of neural network layers, weights included in each of the plurality of neural network layers may be trained based on the plurality of parameter sets and driving result data obtained for each of the plurality of parameter sets. Also, in the step of obtaining a plurality of parameter values, a plurality of parameter values related to driving of the external electronic apparatus may be obtained from an input layer among the plurality of neural network layers as the weights are trained.

The driving result data may include at least one of the size of an area that an object corresponding to the external electronic apparatus ran per unit time on the obtained map, the size of an area that the object corresponding to the external electronic apparatus repeatedly ran on the obtained map, or the time that was taken for the object corresponding to the external electronic apparatus to run an area of a predetermined size on the obtained map.

The sensing data obtained by the external electronic apparatus may be applied to the driving algorithm of the external electronic apparatus controlling the driving of the external electronic apparatus. In addition, in the transmitting step, the plurality of obtained parameter values may be transmitted to the external electronic apparatus for updating the plurality of parameter values of the driving algorithm.

The obtaining of the driving result data, driving of an object corresponding to the external electronic apparatus may be simulated on the obtained map through a simulator stored in the electronic apparatus and the driving result data may be obtained.

According to the various example embodiments of the disclosure as described above, the driving algorithm of an external electronic apparatus can be updated in consideration of the actual driving environment of the external electronic apparatus, and thus the driving performance of the external electronic apparatus can be improved.

A plurality of parameter values for updating a driving algorithm are obtained through an artificial intelligence model, and here, a plurality of parameter values are obtained by training an artificial intelligence model using a large amount of training data obtained through a simulation environment which is identical to the actual driving environment of an external electronic apparatus, and accordingly, a plurality of parameter values optimized for driving of an external electronic apparatus can be obtained.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2 is a flowchart illustrating an example operation of an electronic apparatus according to an embodiment of the disclosure;

FIG. 3 is a flowchart illustrating an example operation of an electronic apparatus according to an embodiment of the disclosure;

DETAILED DESCRIPTION

Figure 1:
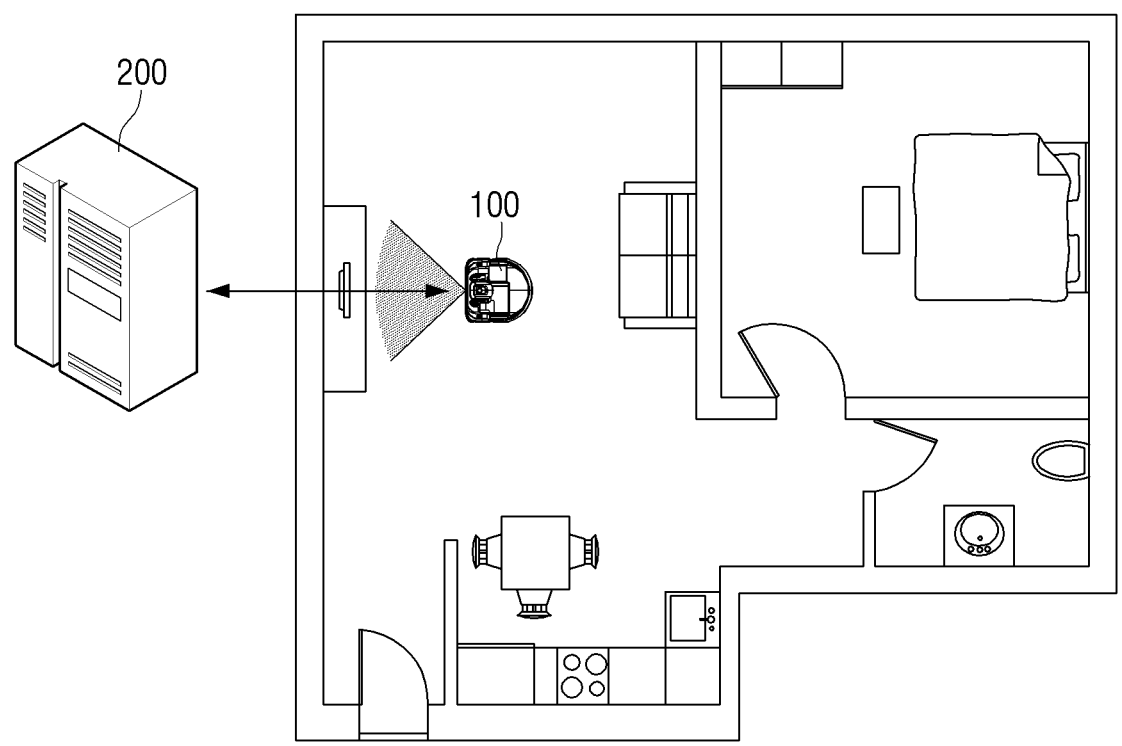
FIG. 1 is a diagram illustrating an example system according to an embodiment of the disclosure.

Hereinafter, the disclosure will be described in greater detail with reference to the accompanying drawings.

Terms used in the disclosure will be described briefly, and then the disclosure will be described in greater detail.

As terms used in describing the example embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. In particular cases, there may be terms that may be arbitrarily selected, and in such cases, the meaning of the terms will be described in the relevant descriptions in the disclosure. Accordingly, the terms used in the disclosure should be defined based on the meaning of the terms and the overall content of the disclosure, not just based on the names of the terms.

Terms such as "first," "second" and the like may be used to describe various elements, but the terms are not intended to limit the elements. Such terms may be used to distinguish one element from another element.

Singular expressions include plural expressions, unless they clearly conflict with the context. In the disclosure, terms such as "include" and "consist of" should be understood as designating that there are such characteristics, numbers, steps, operations, elements, components or a combination thereof described in the disclosure, but not as excluding in advance the existence or possibility of adding one or more of other characteristics, numbers, steps, operations, elements, components or a combination thereof.

In addition, the expression "at least one of A or B" should be interpreted to refer to any one of "A" or "B" or "A and B."

Further, in the disclosure, "a module" or "a part" performs at least one function or operation, and may be implemented as hardware or software, or as a combination of hardware and software. Also, a plurality of "modules" or "parts" may be integrated into at least one module and implemented as at least one processor (not shown), except "modules" or "parts" which need to be implemented as specific hardware.

Hereinafter, various example embodiments of the disclosure will be described with reference to the accompanying drawings. However, the disclosure may be implemented in various different forms, and is not limited to the example embodiments described herein. In the drawings, parts that are not related to explanation may be omitted, to explain the disclosure clearly, and throughout the disclosure, similar components were designated by similar reference numerals.

FIG. 1 is a diagram illustrating an example system according to an embodiment of the disclosure.

The first electronic apparatus 100 may, for example, be implemented as a robot. In this case, the first electronic apparatus 100 may move (or, drive, run) in a place wherein the first electronic apparatus 100 is located by itself, and perform various operations. For example, as illustrated in FIG. 1, the first electronic apparatus 100 may be implemented as a robot cleaner, and suction foreign substances on the floor while moving in a house.

The second electronic apparatus 200 may, for example, be implemented as a server. The second electronic apparatus 200 may be arranged in the place wherein the first electronic apparatus 100 is located, and may be implemented as electronic apparatuses in various types connected with the first electronic apparatus 100 through a network, for example, a television, a refrigerator, etc. However, the disclosure is not limited thereto, and the second electronic apparatus 200 may be implemented as apparatuses in various types that can process data using an artificial intelligence model.

According to an embodiment of the disclosure, the second electronic apparatus 200 may obtain (or, acquire) a plurality of parameter values for updating the driving algorithm of the first electronic apparatus 100 using an artificial intelligence model, transmit the plurality of obtained parameter values to the first electronic apparatus 100, and thereby update the driving algorithm of the first electronic apparatus 100.

Hereinafter, operations of each electronic apparatus 100, 200 for updating a driving algorithm will be described in greater detail with reference to FIGS. 2 and 3.

FIG. 2 is a flowchart illustrating an example operation of the first electronic apparatus according to an embodiment of the disclosure.

Referring to FIG. 2, the first electronic apparatus 100 may obtain sensing data at operation S21.

For example, the first electronic apparatus 100 may obtain sensing data including information on the first electronic apparatus 100 and its surrounding environment using sensors in various types.

The first electronic apparatus 100 may move using a driving algorithm at operation S22.

For example, the first electronic apparatus 100 may apply (or, input) sensing data to a driving algorithm and obtain a control signal for controlling the driving of the first electronic apparatus 100. The first electronic apparatus 100 may drive a motor connected to wheels using the control signal.

The driving algorithm may generate a control signal for controlling the driving of the first electronic apparatus 100 using sensing data and parameter values of each of a plurality of parameters.

In this case, according to what value the parameters value of each parameter is set to, the driving method of the first electronic apparatus 100 related to each parameter may be determined. For example, according to the parameter value of the parameter regarding the rotating direction, the driving algorithm may generate a control signal for rotating the first electronic apparatus 100 in a clockwise direction, or generate a control signal for rotating the first electronic apparatus 100 in a counterclockwise direction when the first electronic apparatus 100 rotates.

Depending on embodiments, the parameter value of each of the plurality of parameters may have the initial value set in the manufacturing process of the first electronic apparatus 100.

The first electronic apparatus 100 may transmit the sensing data to the second electronic apparatus 200 at operation S23.

The first electronic apparatus 100 may receive a plurality of parameter values from the second electronic apparatus 200 at operation S24, and update the driving algorithm using the plurality of parameter values at operation S25.

For example, the first electronic apparatus 100 may change the plurality of parameter values of the driving algorithm to the plurality of parameter values received from the second electronic apparatus 200, and thereby update the driving algorithm.

FIG. 3 is a flowchart illustrating an example operation of the second electronic apparatus according to an embodiment of the disclosure.

Referring to FIG. 3, the second electronic apparatus 200 may receive sensing data from the first electronic apparatus 100 at operation S31, and generate a map for simulation using the sensing data at operation S32.

In this case, the second electronic apparatus 200 may determine the shape (or, the structure, the topography), etc. of the place wherein the first electronic apparatus 100 actually runs using the sensing data received from the first electronic apparatus 100, and generate a map for simulation which is identical to the actual driving place of the first electronic apparatus 100 using this.

The second electronic apparatus 200 may simulate driving on the map for simulation and obtain training data at operation S33.

For example, the second electronic apparatus 200 may simulate the driving of the first electronic apparatus 100 a plurality of times while changing the plurality of parameter values of the driving algorithm on the map for simulation, and thereby obtain driving result data. In this case, training data may be the plurality of parameter values and the driving result data obtained according to the plurality of parameter values.

The second electronic apparatus 200 may train an artificial intelligence model using the training data and obtain a plurality of parameter values of the driving algorithm at operation S34, and transmit the plurality of parameter values to the first electronic apparatus 100 at operation S35.

In this case, the first electronic apparatus 100 may update the driving algorithm using the plurality of parameter values received from the second electronic apparatus 200.

As described above, in case the plurality of parameter values of the driving algorithm of the first electronic apparatus 100 are set as initial values, as such initial values are not values set in consideration of the shape of the place wherein the first electronic apparatus 100 actually moves, the positions, the sizes, etc. of the objects (e.g., a wall or an obstacle, etc.) existing in the place, the first electronic apparatus 100 may not perform driving optimized for the actual driving environment.

According to an embodiment of the disclosure, the second electronic apparatus 200 may obtain optimal parameter values for the first electronic apparatus 100 in consideration of (e.g., based on) the actual driving environment of the first electronic apparatus 100, and transmit the parameter values to the first electronic apparatus 100, and thereby update the parameter values of the first electronic apparatus 100.

In this case, the plurality of parameter values for updating the driving algorithm are obtained through an artificial intelligence model, and the plurality of parameter values are obtained by training an artificial intelligence model using a large amount of training data obtained through a simulation environment identical to the actual driving environment of the first electronic apparatus 100, and thus the parameter values may be parameter values optimized for driving of the first electronic apparatus 100. Accordingly, when the driving algorithm of the first electronic apparatus 100 is updated based on the aforementioned plurality of parameter values, the first electronic apparatus 100 may perform optimal driving that suits the actual driving environment.

Figure 4A:
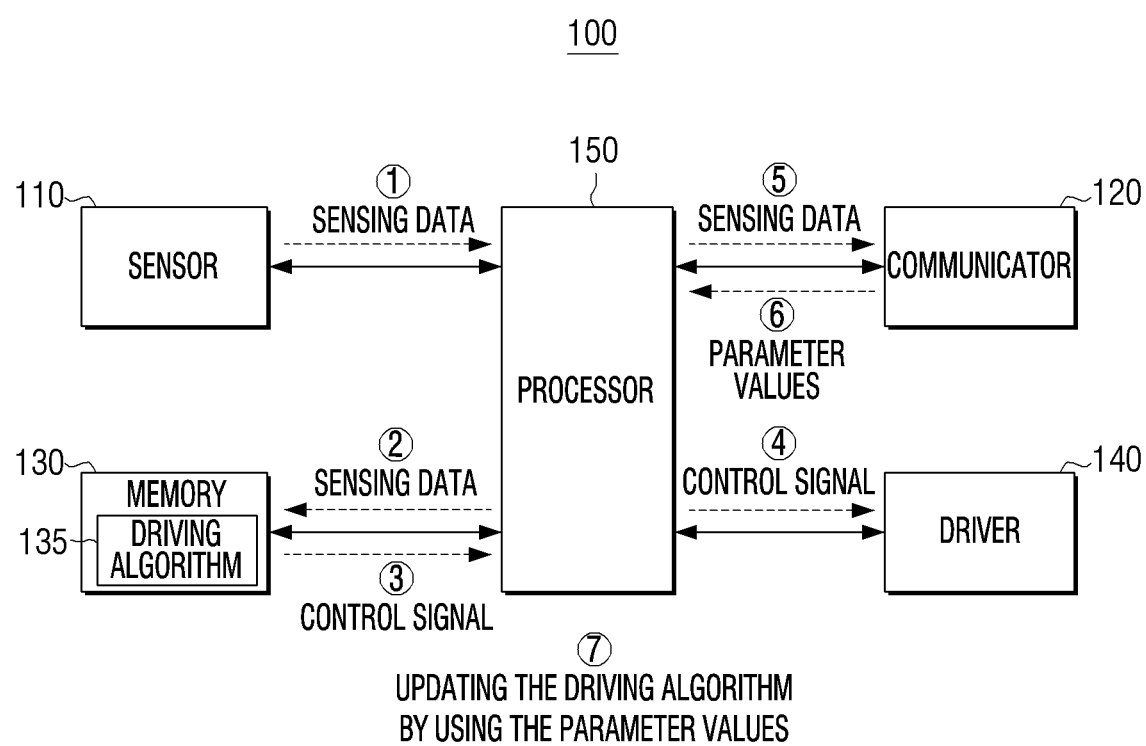
FIG. 4A is a block diagram illustrating an example configuration of an electronic apparatus according to an embodiment of the disclosure.

FIG. 4A is a block diagram illustrating an example configuration of an electronic apparatus according to an embodiment of the disclosure.

The electronic apparatus 100 illustrated in FIG. 4A may be the first electronic apparatus 100 illustrated in FIG. 1. Referring to FIG. 4A, the electronic apparatus 100 may include a sensor 110, a communicator (e.g., including communication circuitry) 120, a memory 130, a driver (e.g., including a motor) 140, and a processor (e.g., including processing circuitry) 150.

The sensor 110 may obtain sensing data. The sensing data may include information on the electronic apparatus 100 and the surrounding environment of the electronic apparatus 100.

For example, information on the electronic apparatus 100 may include information on the moving distance, collision, etc. of the electronic apparatus 100, and information on the surrounding environment may include the positions of objects existing in the surroundings of the electronic apparatus 100, the distance between the electronic apparatus 100 and the surrounding objects, etc.

For this, the sensor 110 may include, for example, and without limitation, at least one of a light detection and ranging (LiDAR) sensor, a camera, a cliff detection sensor, a collision detection sensor, an infrared sensor, a gyro sensor, an optical sensor, or the like. However, the aforementioned sensor is merely an example, and types of the sensor are not limited as long as it is a sensor that can obtain the aforementioned information.

The LiDAR sensor may irradiate a laser to the surroundings of the electronic apparatus 100, and detect the distance between the electronic apparatus 100 and an object existing in the surroundings of the electronic apparatus 100 using the reflected light.

In this case, the LiDAR sensor may irradiate laser in directions such as the front surface or the front surface and the side surface, etc. of the electronic apparatus 100. The LiDAR sensor may be provided to be rotatable, and irradiate laser in 360° directions according to rotation.

According to various example embodiments, in case the LiDAR sensor is implemented as a three-dimensional LiDAR sensor, the three-dimensional LiDAR sensor may recognize the shape (or, the structure, the topography, etc.) of the place wherein the electronic apparatus 100 is located using distance data for the three-dimensional space around the electronic apparatus 100.

The camera may photograph the surroundings of the electronic apparatus 100, and obtain at least one image for the surroundings of the electronic apparatus 100. In this case, the camera may perform photographing in the front surface direction or the upper side direction, etc. of the electronic apparatus 100, and photograph various objects existing in the surroundings of the electronic apparatus 100 such as a ceiling, a wall surface, an entrance, an obstacle, etc.

According to various embodiments, the camera may be implemented as a three-dimensional camera. For example, in case the camera is implemented as an RGB-Depth camera, the RGB-Depth camera may recognize the shape of the place wherein the electronic apparatus 100 is located, and recognize RGB colors, etc. of an object around the electronic apparatus 100.

The cliff detection sensor may refer, for example, to a component for detecting a cliff in the lower part of the electronic apparatus 100. For example, the cliff detection sensor may be a component for detecting another bottom surface which has a difference in height from the bottom surface on which the electronic apparatus 100 is placed, such as a step, a handrail, etc.

For example, the cliff detection sensor may irradiate light in the lower side direction of the electronic apparatus 100, and detect the distance from the bottom surface existing in the lower side of the electronic apparatus 100 using the time that is taken for the irradiated light to be reflected and received at the electronic apparatus 100, etc.

In case the electronic apparatus 100 collides with an external object, etc., the collision detection sensor may detect the collision. In this case, the collision detection sensor may be provided on the bumper provided on the front surface of the electronic apparatus 100, etc.

The infrared sensor may refer, for example, to a component for detecting the distance to an object around the electronic apparatus 100.

For example, the infrared sensor may irradiate an infrared signal to the surroundings of the electronic apparatus 100, and detect the distance between the electronic apparatus 100 and a surrounding object using the time that is taken for the irradiated infrared signal to be reflected by an external object and received at the electronic apparatus 100, etc. In this case, the infrared sensor may irradiate an infrared signal in directions such as the front surface or the front surface and the side surface, etc. of the electronic apparatus 100.

The gyro sensor may detect the rotating direction and the rotating angle of the electronic apparatus 100 through a tilting angle, angular velocity, angular acceleration, etc.

The optical sensor may irradiate light toward the bottom on which the electronic apparatus 100 is placed, and when the irradiated light is reflected on the bottom and received at the electronic apparatus 100, the optical sensor may detect the moving distance of the electronic apparatus 100 based on the pattern of the received light, etc.

As described above, the sensor 110 may obtain sensing data through sensors of various types.

The communicator 120 may include various communication circuitry and performs communication with an external electronic apparatus, e.g., the second electronic apparatus 200.

The communicator 120 may perform communication with the external electronic apparatus 200 using various wired or wireless communication methods, and for this, the communicator 120 may include a wireless communication module, a wired communication module, etc.

For example, the communicator 120 may perform communication with the external electronic apparatus 200 through communication methods such as Wi-Fi based on AP (Wi-Fi, a wireless LAN network), Bluetooth, Zigbee, wired/wireless local area networks (LANs), a wide area network (WAN), Ethernet, IEEE 1394, a high-definition multimedia interface (HDMI), a universal serial bus (USB), thunderbolt, a mobile high-definition link (MHL), Audio Engineering Society/European Broadcasting Union (AES/EBU), optical, coaxial, etc.

The memory 130 may store various data necessary for the various embodiments of the disclosure. For example, the memory 130 may store various programs and data in accordance thereto for controlling or operating the electronic apparatus 100.

The memory 130 may be implemented in the form of a memory embedded in the electronic apparatus 100, or in the form of a memory that can be attached to or detached from the electronic apparatus 100, according to the usage of stored data. For example, in the case of data for operating the electronic apparatus 100, the data may be stored in a memory embedded in the electronic apparatus 100, and in the case of data for an extensive function of the electronic apparatus 100, the data may be stored in a memory that can be attached to or detached from the electronic apparatus 100.

A memory embedded in the electronic apparatus 100, the memory may be implemented, for example, and without limitation, as at least one of a volatile memory (e.g.: a dynamic RAM (DRAM), a static RAM (SRAM), or a synchronous dynamic RAM (SDRAM), etc.) or a non-volatile memory (e.g.: a one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: a NAND flash or a NOR flash, etc.), a hard drive, or a solid state drive (SSD)). Also, in the case of a memory that can be attached to or detached from the electronic apparatus 100, the memory may be implemented as forms such as a memory card (e.g., a compact flash (CF), a secure digital (SD), a micro secure digital (Micro-SD), a mini secure digital (Mini-SD), an extreme digital (xD), a multi-media card (MMC), etc.), an external memory that can be connected to a USB port (e.g., a USB memory), and the like.

According to an embodiment of the disclosure, the memory 130 may be implemented as a single memory that stores data generated in various operations according to the disclosure. However, depending on embodiments, the memory 130 may be implemented to include a plurality of memories.

The memory 130 may store a driving algorithm 135. The driving algorithm 135 may be for controlling the driving of the electronic apparatus 100, and may be implemented as software and stored in the memory 130.

The driver 140 may refer, for example, to a component for moving the electronic apparatus 100. For this, the driver 140 may include wheels and a driving unit such as a motor to drive the wheels.

The processor 150 may include various processing circuitry and is electronically connected with the sensor 110, the communicator 120, the memory 130, and the driver 140, and controls the overall operations of the electronic apparatus 100. For example, the processor 150 may perform the operations of the electronic apparatus 100 according to the various embodiments of the disclosure by executing at least one instruction stored in the memory 130.

According to an embodiment of the disclosure, the processor 150 may include, for example, and without limitation, one or more of a central processing unit (CPU), a dedicated processor, a micro controller unit (MCU), a micro processing unit (MPU), a controller, a graphics processing unit (GPU), an artificial intelligence (AI) processor, a neural processing unit (NPU), an application processor (AP), or the like. The processor 150 may be implemented as a system on chip (SoC) having a processing algorithm stored therein or large scale integration (LSI), or in the forms of an application specific integrated circuit (ASIC) and a field programmable gate array (FPGA).

The processor 150 for executing an artificial intelligence model according to an embodiment of the disclosure may include one or a plurality of processors. The one or plurality of processors may include generic-purpose processors such as CPUs, APs, etc., graphics-dedicated processors such as GPUs and vision processing units (VPUs), or artificial intelligence-dedicated processors such as NPUs, etc. In this case, the one or plurality of processors may perform control to process input data according to predefined operation rules or an artificial intelligence model stored in the memory 130. The predefined operation rules or the artificial intelligence model may be characterized in that they are made through training (or, learning).

The feature of being made through training may refer, for example, to predefined operation rules or an artificial intelligence model having desired characteristics being made by applying a learning algorithm to a plurality of training data. Such learning may be performed in an apparatus itself wherein artificial intelligence according to the disclosure is performed, or performed through a separate server/system.

Depending on embodiments, the memory 130 including a ROM and a RAM and the processor 150 may be implemented inside the electronic apparatus 100 to be included inside the same chip.

The processor 150 may control the sensor 110 to obtain sensing data. For example, the processor 150 may control the sensor 110 to obtain sensing data while the electronic apparatus 100 is in a state of halt, or while the electronic apparatus 100 is moving.

The processor 150 may receive sensing data from the sensor 110 (refer to ① of FIG. 4A), and control the driving of the electronic apparatus 100 based on the sensing data.

The processor 150 may use the driving algorithm 135 stored in the memory 130.

For example, the processor 150 may execute the driving algorithm 135 stored in the memory 130, input the sensing data received from the sensor 110 into the driving algorithm 135 (refer to ② of FIG. 4A) and obtain a control signal from the driving algorithm 135 (refer to ③ of FIG. 4A), and control the driving of the electronic apparatus 100 based on the obtained control signal.

The driving algorithm 135 may generate a control signal for controlling the driving of the electronic apparatus 100 using the sensing data.

For example, the driving algorithm 135 may generate, using the sensing data, a map regarding the place where the electronic apparatus 100 runs, and determine the position of the electronic apparatus 100 on the map. The driving algorithm 135 may generate, using the sensing data, a control signal for moving the electronic apparatus 100 on the map. In this case, the driving algorithm 135 may determine objects and a cliff, etc. around the electronic apparatus 100, and control the movement of the electronic apparatus 100 according to the determination result.

For example, while the electronic apparatus 100 is moving in a straight line and it is determined that an obstacle exists in the front side based on the sensing data, the driving algorithm 135 may generate a control signal that makes the electronic apparatus 100 rotate by 180° and run in a straight line again (e.g., running in a zig-zag way wherein running paths partially overlap such as '⇌'), or generate a control signal for making detour around an obstacle in the form of a semicircle.

As another example, if it is determined that a cliff exists in the lower side of the electronic apparatus 100 based on the sensing data, the driving algorithm 135 may generate a control signal that makes the electronic apparatus 100 rotate by 90° and run in a straight line again.

When generating a control signal using sensing data, the driving algorithm 135 may consider a plurality of parameter values of a plurality of parameters. In this case, the driving method of the electronic apparatus 100 related to the parameters may be determined according to the parameter values of each parameter.

For example, the driving algorithm 135 may determine in which position on the map the driving of the electronic apparatus 100 will start, and during rotation of the electronic apparatus 100, in which direction (e.g., a clockwise direction or a counterclockwise direction) the electronic apparatus 100 will be rotated, by what degree the electronic apparatus 100 will be rotated, or during zig-zig driving, how much the driving paths in straight lines in opposite directions from each other will overlap, etc. based on the parameter values set for each parameter, and generate a control signal for controlling the driving of the electronic apparatus 100 according to the determined driving method.

The plurality of parameters may be various parameters related to the driving of the electronic apparatus 100.

For example, the plurality of parameters may include, without limitation, a parameter regarding the initial starting position of the electronic apparatus 100, a parameter regarding the initial speed of the electronic apparatus 100, a parameter regarding a rotating direction during rotation of the electronic apparatus 100, a parameter regarding a rotating angle of the electronic apparatus 100, a parameter regarding the degree of proximity to an obstacle, and during zig-zag driving, the degree of overlapping of driving paths in straight lines in opposite directions from each other, etc.

However, the above parameters are merely an example, and it will be understood that the plurality of parameters may include only some of the parameters, or further include various parameters related to the driving of the electronic apparatus 100.

Accordingly, depending on what value the parameter value of each parameter is set to, the driving algorithm 135 may generate a control signal for controlling the electronic apparatus 100 by a driving method corresponding thereto.

For example, according to the parameter value of a parameter regarding a rotating direction, the driving algorithm 135 may generate a control signal for rotating the electronic apparatus 100 in a clockwise direction, or generate a control signal for rotating the electronic apparatus 100 in a counterclockwise direction during rotation of the electronic apparatus 100.

As another example, according to the parameter value of a parameter regarding the degree of proximity to an obstacle, if it is determined that an obstacle exists on a point that is distant from the electronic apparatus by 5 cm, the driving algorithm 135 may generate a control signal for rotating the electronic apparatus by 180°, or if it is determined that an obstacle exists on a point that is distant from the electronic apparatus 100 by 10 cm, the driving algorithm 135 may generate a control signal for rotating the electronic apparatus 100 by 180°.

As still another example, according to the parameter value of a parameter regarding the degree of proximity to an obstacle, the driving algorithm 135 may generate a control signal for moving the electronic apparatus 100 along a wall on a point that is distant from the wall by, for example, 5 cm, or generate a control signal for moving the electronic apparatus 100 along a wall on a point that is distant from the wall by, for example, 10 cm.

As described above, the driving algorithm 135 may generate a control signal for the driving of the electronic apparatus 100 using sensing data and a plurality of parameter values of a plurality of parameters, and in this case, the driving method of the electronic apparatus 100 may vary according to what value the parameter value of each parameter is set to. Meanwhile, depending on embodiments, the parameter value of each of the plurality of parameters may have the initial value set in the manufacturing process of the electronic apparatus 100.

The driving algorithm 135 will be described in greater detail with reference to FIG. 4B.

Figure 4B:
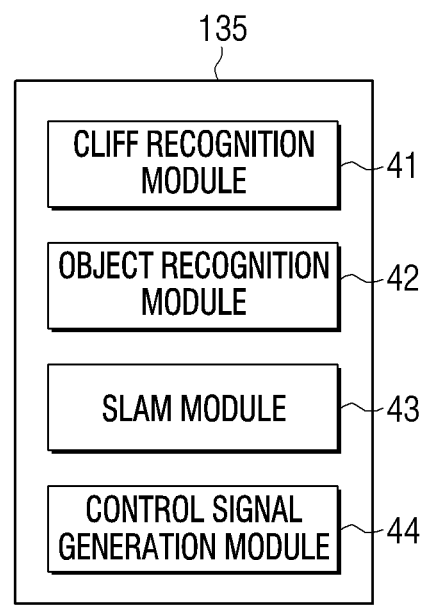
FIG. 4B is a diagram illustrating an example software configuration of a driving algorithm according to an embodiment of the disclosure.

FIG. 4B is a diagram illustrating example modules included a driving algorithm according to an embodiment of the disclosure.

For example, referring to FIG. 4B, the driving algorithm 135 may include a cliff recognition module (e.g., including processing circuitry and/or executable program elements) 41, an object recognition module (e.g., including processing circuitry and/or executable program elements) 42, a simultaneous localization and mapping (SLAM) module (e.g., including processing circuitry and/or executable program elements) 43, and a control signal generation module (e.g., including processing circuitry and/or executable program elements) 44.

Such modules may be implemented as software, and executed by the processor 150. For example, the processor 150 may load the cliff recognition module 41, the object recognition module 42, the SLAM module 43, and the control signal generation module 44 stored in the memory 130 on the RAM, and execute instructions corresponding to the modules according to a set order.

The cliff recognition module 41 may obtain information on whether a cliff exists in the lower part of the electronic apparatus 100 using sensing data, to be specific, data of distance to the bottom surface obtained from the cliff detection sensor.

The object recognition module 42 may obtain information on an object around the electronic apparatus 100 using sensing data, to be specific, an image obtained from the camera and data of distance to a surrounding object obtained from the LiDAR sensor.

In this case, the object recognition module 42 may use an artificial intelligence model stored in the memory 130. The artificial intelligence model may, for example, be an artificial intelligence model trained to identify an object and the size of the object in an input image.

Accordingly, the object recognition model 42 may input an image obtained from the camera into the artificial intelligence model, and obtain information on what kind of object the object existing in the surroundings of the electronic apparatus 100 is and information on the size of the object from the artificial intelligence model.

The object recognition model 42 may determine the distance between the electronic apparatus 100 and the identified object using data of distance to the surrounding object.

As described above, the object recognition module 42 may determine an object in the surroundings of the electronic apparatus 100 using the input sensing data, and obtain information on the determined object (e.g., the object, the size of the object, the distance between the electronic apparatus 100 and the object, etc.).

The SLAM module 43 may perform a SLAM function. That is, the SLAM module 43 may generate, using sensing data, a map regarding the place where the electronic apparatus 100 runs. For example, an image obtained from the camera, data of distance to a surrounding object obtained from the LiDAR sensor, data regarding collision of the electronic apparatus 100 obtained from the collision detection sensor, data of distance to a surrounding object obtained from the infrared sensor, data regarding the rotating direction and the rotating angle of the electronic apparatus 100 obtained from the gyro sensor, data regarding the moving distance of the electronic apparatus 100 obtained from the optical sensor, etc., and determine the position of the electronic apparatus 100.

For example, the SLAM module 43 may analyze images obtained from the camera, detect feature points from the ceiling or wall surface, etc. included in the images, generate a map regarding the place where the electronic apparatus 100 runs based on the feature points, and determine the position of the electronic apparatus 100. As another example, the SLAM module 43 may generate, using data of distance to a surrounding object obtained from the LiDAR sensor, etc., a map regarding the place where the electronic apparatus 100 runs, and determine the position of the electronic apparatus 100.

The SLAM module 43 may combine other sensing data and use the data when generating a map and determining a position.

The SLAM module 43 may divide a map into a plurality of sections. For example, the SLAM module 43 may identify a point wherein there is a dividing line or a raised spot on the bottom, a point wherein the movable width becomes narrow, a point wherein there is a wall, a point wherein a wall ends, a point wherein there is a door, etc. using images obtained through the camera, and divide a map into a plurality of sections with the identified points as boundaries between sections.

Data regarding a map generated as above may be stored in the memory 130. In this case, the data regarding the map may include information on the shape, the size, etc. of the place that the map expresses, information on the shape and size of each of the plurality of sections, and information on the position of each section on the map.

The control signal generation module 44 may access information obtained at each module, and generate a control signal for the driving of the electronic apparatus 100.

For example, the control signal generation module 44 may generate a control signal for moving the electronic apparatus 100 on a map using information obtained at each module. The control signal generation module 44 may determine whether objects and a cliff, etc. exist on the path wherein the electronic apparatus 100 moves, and in case objects and a cliff, etc. exist, for avoiding them, the control signal generation module 44 may generate a control signal for rotating the electronic apparatus 100 and moving the electronic apparatus 100 again.

The control signal generation module 44 may determine the driving method related to each parameter using the parameter value of each of the plurality of parameters, and generate a control signal for controlling the driving of the electronic apparatus 100 according to the determined driving method.

In a case where a map includes a plurality of sections, the control signal generation module 44 may generate a control signal for driving one section, and if driving for the section is completed, the control signal generation module 44 may generate a control signal for moving the electronic apparatus 100 to another section. During driving for one section, the control signal generation module 44 may generate a control signal for starting driving from a specific point inside the section and moving the section in a zig-zag method.

The processor 150 may control the driving of the electronic apparatus 100 based on the obtained control signal.

For example, the processor 150 may operate the driver 140 based on the control signal (refer to ④ in FIG. 4A). Here, the driver 140 may include wheels and a motor to drive the wheels.

For example, the processor 150 may control the driving speed, the rotating direction, etc. of the motor according to a control signal, and drive the wheels connected with the motor. Accordingly, the electronic apparatus 100 may be moved, stopped, and rotated.

The electronic apparatus 100 may receive the plurality of parameter values of the plurality of parameters of the driving algorithm 135 from the external electronic apparatus 200, and update the driving algorithm 135 using the plurality of received parameter values.

The processor 150 may transmit the sensing data obtained from the sensor 110 to the external electronic apparatus 200 through the communicator 120 (refer to ⑤ in FIG. 4A).

In this case, the processor 150 may transmit the sensing data to the external electronic apparatus 200 through the communicator 120 at a specific time point.

For example, when sensing data is obtained by the sensor 110, the processor 150 may transmit the obtained sensing data to the external electronic apparatus 200 in real time. As another example, the processor 150 may store the sensing data obtained by the sensor 110 in the memory 130, and when a specific time point is reached (e.g., a time point when an operation of the electronic apparatus 100 according to a user command is completed, or per predetermined period), the processor 150 may transmit the sensing data stored in the memory 130 to the external electronic apparatus 200.

Depending on embodiments, the processor 150 may transmit data for a map to the external electronic apparatus 200 through the communicator 120.

The processor 150 may transmit information on the driving algorithm 135 of the electronic apparatus 100 to the external electronic apparatus 200 through the communicator 120.

Information on the driving algorithm may, for example, be information used for the external electronic apparatus 200 to identify the driving algorithm 135 of the electronic apparatus 100. For example, information on the driving algorithm may include information on the electronic apparatus 100 or information on the driving algorithm itself, etc.

If the plurality of parameter values are received from the external electronic apparatus 200 through the communicator 120 (refer to ⑥ in FIG. 4A), the processor 150 may update the driving algorithm 135 using the plurality of received parameter values (refer to ⑦ in FIG. 4A).

For example, the processor 150 may change the parameter values set for each of the plurality of parameter values of the driving algorithm 135 to the parameter values received from the external electronic apparatus 200 and thereby update the parameter values of the driving algorithm 135.

For example, the processor 150 may change the parameter value of the parameter regarding the rotating direction to the parameter value of the parameter regarding the rotating direction received from the external electronic apparatus 200, and change the parameter value of the parameter regarding the degree of proximity to an obstacle to the parameter value of the parameter regarding the degree of proximity to an obstacle received from the external electronic apparatus 200.

When the driving algorithm 135 is updated, the processor 150 may control the driving of the electronic apparatus 100 based on the control signal obtained from the updated driving algorithm 135.

As described above, the processor 150 may update the plurality of parameter values of the driving algorithm 135 using the plurality of parameter values received from the external electronic apparatus 200, and control the driving of the electronic apparatus 100 using the updated driving algorithm 135.

When the driving algorithm 135 is updated, the processor 150 may move in the entire area of the map using the updated driving algorithm 135.

The processor 150 may change the plurality of parameter values of the driving algorithm 135 based on the section wherein the electronic apparatus 100 is located on the map.

For this, the external electronic apparatus 200 may transmit the parameter sets for each of the plurality of sections to the electronic apparatus 100. Here, the parameter sets may include the parameter values of each of the plurality of parameters of the driving algorithm.

For example, the external electronic apparatus 200 may transmit information on each of the plurality of sections included in the map (e.g., the name, the use) and the parameter sets for each of the plurality of sections to the electronic apparatus 100.

In this case, the processor 150 may receive the information from the external electronic apparatus 200 through the communicator 120. Then, the processor 150 may determine the section wherein the electronic apparatus 100 is located on the map using the received information, and determine the parameter set corresponding to the section wherein the electronic apparatus 100 is located among the plurality of parameter sets received from the external electronic apparatus 200. The processor 150 may set the plurality of parameter values included in the parameter set corresponding to the section wherein the electronic apparatus 100 is located as the plurality of parameter values of the driving algorithm 135.

Accordingly, the driving algorithm 135 may generate a control signal for controlling the driving of the electronic apparatus 100 using the plurality of parameter values corresponding to the section wherein the electronic apparatus 100 is located.

Figure 5A:
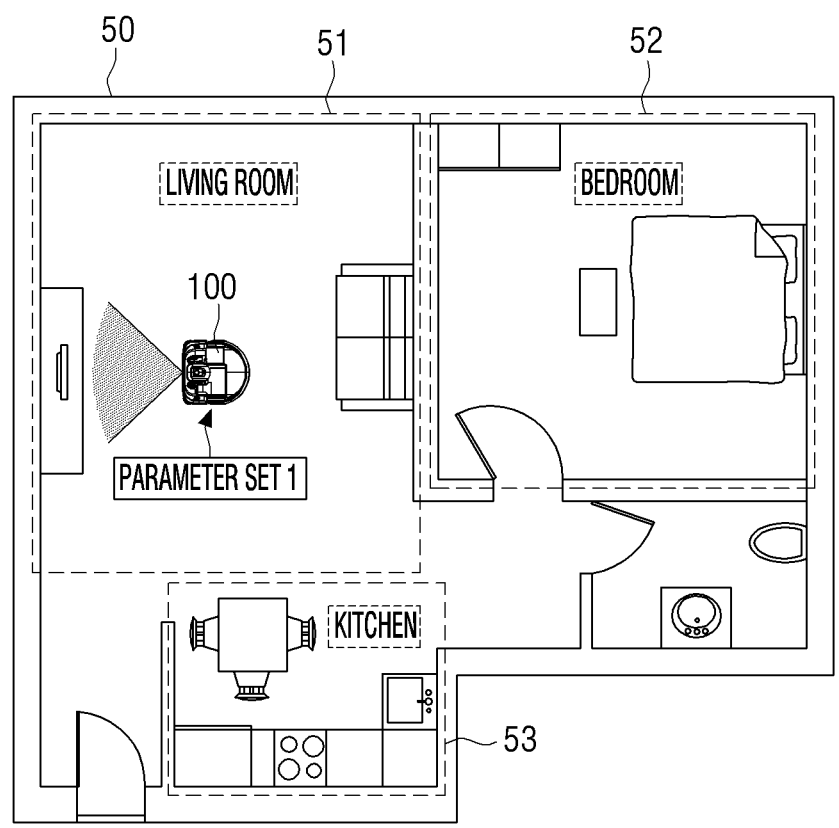
FIG. 5A is a diagram illustrating an example method of using a plurality of parameter values of a driving algorithm for each section of a map according to an embodiment of the disclosure.
Figure 5B:
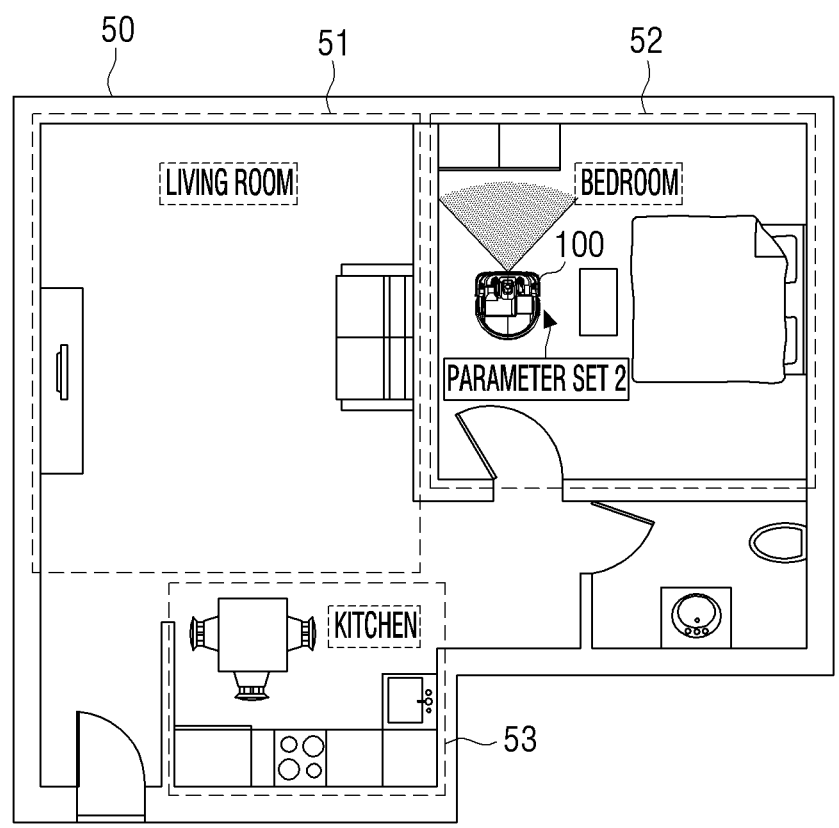
FIG. 5B is a diagram illustrating an example method of using a plurality of parameter values of a driving algorithm for each section of a map according to an embodiment of the disclosure.

For example, a case wherein the map 50 is divided into a living room 51, a bedroom 52, and a kitchen 53 is assumed, as illustrated by way of non-limiting example in FIG. 5A and FIG. 5B.

Referring to FIG. 5A, if it is determined that the electronic apparatus 100 is located in the living room 51 on the map 50, the processor 150 may determine the parameter set corresponding to the living room 51 (e.g., the parameter set 1 in FIG. 5A) among the plurality of parameter sets received from the external electronic apparatus 200, and set the plurality of parameter values included in the determined parameter set as the plurality of parameter values of the driving algorithm 135.

Referring to FIG. 5B, if it is determined that the electronic apparatus 100 moved from the living room 51 to the bedroom 52 and is located in the bedroom 52, the processor 150 may determine the parameter set corresponding to the bedroom 52 (e.g., the parameter set 2 in FIG. 5B) among the plurality of parameter sets received from the external electronic apparatus 200, and set the plurality of parameter values included in the determined parameter set as the plurality of parameter values of the driving algorithm 135.

Accordingly, the driving algorithm 135 may generate a control signal for controlling the driving of the electronic apparatus 100 using the plurality of parameter values included in the parameter set 1 while the electronic apparatus 100 is moving in the living room 51, and generate a control signal for controlling the driving of the electronic apparatus 100 using the plurality of parameter values included in the parameter set 2 while the electronic apparatus 100 is moving in the bedroom 52.

As described above, according to an embodiment of the disclosure, the electronic apparatus 100 may control driving for each section wherein the electronic apparatus 100 is located using the plurality of parameter values corresponding to each section.

Figure 6:
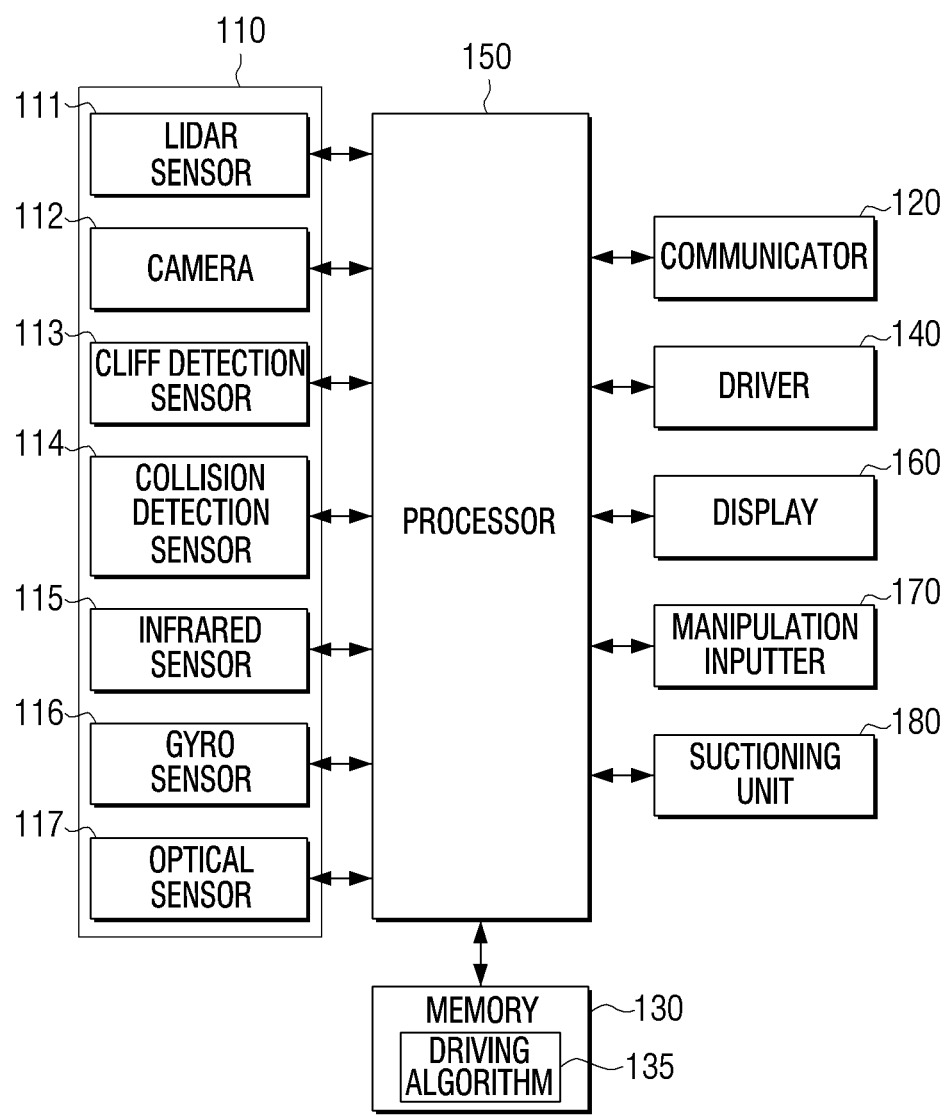
FIG. 6 is a block diagram illustrating an example configuration of an electronic apparatus according to an embodiment of the disclosure.

FIG. 6 is a block diagram illustrating an example configuration of an electronic apparatus according to an embodiment of the disclosure.

FIG. 6, is a diagram illustrating an example wherein the electronic apparatus 100 is implemented as a robot cleaner.

The electronic apparatus 100 may run in the place wherein the electronic apparatus 100 is located (e.g., a house) by itself, and automatically suction foreign substances such as filth and dust, etc. existing on the surface to be cleaned.

The electronic apparatus 100 may move on the surface to be cleaned using the wheels installed on the left side and the right side of the main body. In this case, the wheels may be configured to rotate by a driving unit such as a motor, etc.

The electronic apparatus 100 may include a cleaning apparatus for suctioning foreign substances from the surface to be cleaned. On the cleaning apparatus, a cleaning tool (e.g., a brush) for collecting foreign substances may be rotatably installed. The cleaning apparatus may generate a force for suctioning through a driving unit such as a suctioning motor, and thereby suction foreign substances from the surface to be cleaned. In this case, the suctioned foreign substances may be housed in a dust collecting apparatus provided on the electronic apparatus 100.

As described above, the electronic apparatus 100 may move on the surface to be cleaned, and suction foreign substances existing on the surface to be cleaned.

Referring to FIG. 6, the electronic apparatus 100 may include a sensor 110, a communicator (e.g., including communication circuitry) 120, a memory 130, a driver (e.g., including a motor) 140, a processor (e.g., including processing circuitry) 150, a display 160, a manipulation inputter (e.g., including input circuitry) 170, and a suctioning unit (e.g., including a motor) 180.

As the sensor 110, the communicator 120, the memory 130, the driver 140, and the processor 150 are the same as or similar to the components illustrated in FIG. 4A, overlapping explanation regarding these components may not be repeated here. Components including the display 160, the manipulation inputter 170, and the suctioning part 180 may be controlled by the processor 150.

The sensor 110 may include, for example, and without limitation, a LiDAR sensor 111, a camera 112, a cliff detection sensor 113, a collision detection sensor 114, an infrared sensor 115, a gyro sensor 116, and an optical sensor 117. However, these are merely an example, and the sensor 110 may include only some of these sensors, or further include different kinds of sensors in addition to these sensors.

The display 160 may display various kinds of information supported by the electronic apparatus 100. Such a display 160 may be implemented, for example, and without limitation, as a liquid crystal display (LCD), etc., and may also be implemented as a touch screen that can simultaneously perform the function of the manipulation inputter 170 that will be described below.

For example, the display 160 may display information related to proceeding of cleaning (e.g., information such as the proceeding time of cleaning, the current cleaning mode, battery information, whether the apparatus is charged, whether the dust bin is fully filled with dust, the error state, etc.).

The manipulation inputter 170 may include various input circuitry, and may include, for example, a plurality of function keys by which a user can set or select various kinds of functions supported by the electronic apparatus 100. Such a manipulation inputter 170 may be implemented, for example, as a plurality of buttons, etc., and may also be implemented as a touch screen that can simultaneously perform the aforementioned function of the display 160.

The manipulation inputter 170 may receive inputs of on/off commands of the electronic apparatus 100, on/off commands of the functions of the electronic apparatus 100 (e.g., a command to start cleaning and a command to stop cleaning), commands for selecting cleaning modes (e.g., an entire cleaning mode for cleaning the entire area, a partial cleaning mode for cleaning a partial area, etc.), and the like.

The suctioning unit 180 may include various circuitry and component that provide suction of foreign substances on the surface to be cleaned of the electronic apparatus 100. The suctioning unit 180 may include, for example, a cleaning tool (e.g., a brush) for collecting foreign substances, a driving unit such as a motor for generating a suctioning force, a dust collecting apparatus wherein suctioned foreign substances are housed, etc.

For example, the suctioning unit 180 may perform a cleaning operation by suctioning foreign substances existing in the lower side of the electronic apparatus 100 while the electronic apparatus 100 is moving or stopped. Such a suctioning unit 180 may further include an air purifying unit purifying foreign substances in the air.

The electronic apparatus 100 may further include a battery (not shown) for supplying power to the electronic apparatus 100, a signal receiver (not shown) for receiving a signal transmitted from the charger, a remote control signal receiver (not shown) receiving a remote control signal controlling the operation of the electronic apparatus 100, etc.

The processor 150 may include various processing circuitry and perform a cleaning operation by controlling these components.

For example, when a command to start cleaning is input, the processor 150 may drive the sensor 110 and control the sensor 110 to obtain sensing data.

The processor 150 may apply the sensing data to the driving algorithm 135 and obtain a control signal from the driving algorithm 135, and drive the motor of the driver 140 based on the obtained control signal, and thereby move the electronic apparatus 100.

In this case, the driver 140 may include a motor for driving the wheel on the left side and a motor for driving the wheel on the right side, and move the electronic apparatus 100 in a straight direction by driving the wheel on the left side and the wheel on the right side, or rotate the electronic apparatus 100 to the left side or to the right side by making a difference in the rotating speed of the wheel on the left side and the wheel on the right side.

The processor 150 may drive the suctioning unit 180, and suction foreign substances existing in the lower side of the electronic apparatus 100 while the electronic apparatus 100 is moving or stopped.

If a signal transmitted from the charger is received through the signal receiver (not shown), or the charged amount of the battery (not shown) becomes lower than or equal to a predetermined value, the processor 150 may obtain a control signal for moving the electronic apparatus 100 from the driving algorithm 135 to the charger, and control the driver 140 using the obtained control signal, and move the electronic apparatus 100 to the charger. Accordingly, the electronic apparatus 100 may be connected with the charger, and the battery (not shown) may be charged.

Figure 7A:
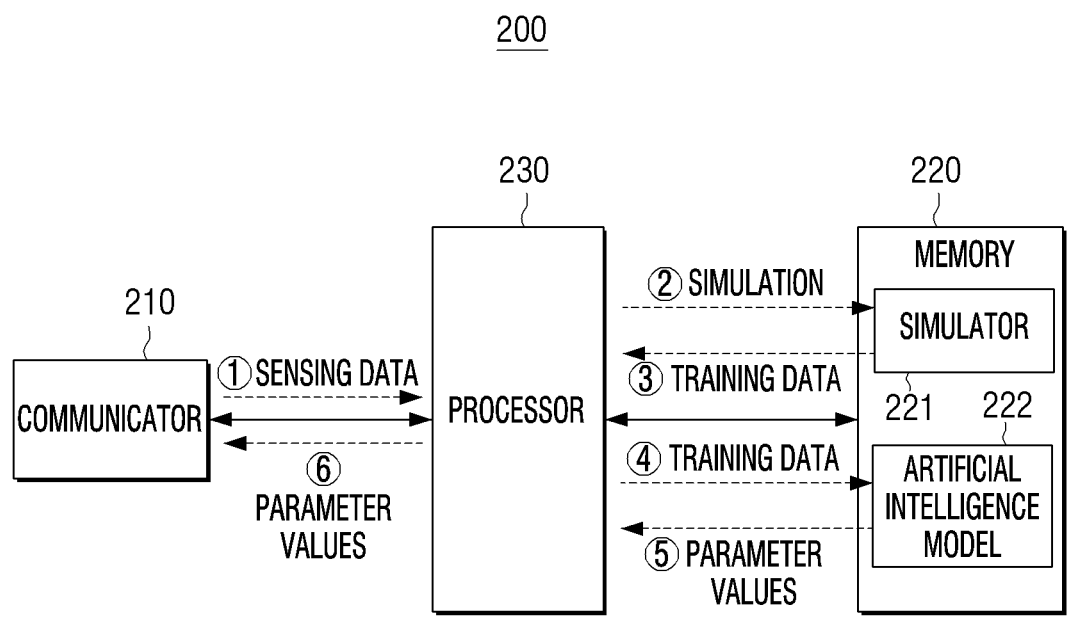
FIG. 7A is a block diagram illustrating an example configuration of an electronic apparatus according to an embodiment of the disclosure.

FIG. 7A is a block diagram illustrating an example configuration of an electronic apparatus according to an embodiment of the disclosure.

The electronic apparatus 200 illustrated in FIG. 7A may be the second electronic apparatus 200 illustrated in FIG. 1. Referring to FIG. 7A, the electronic apparatus 200 may include a communicator (e.g., including communication circuitry) 210, a memory 220, and a processor (e.g., including processing circuitry) 230.

The communicator 210 may include various communication circuitry and performs communication with an external electronic apparatus, e.g., the first electronic apparatus 100.

The communicator 210 may perform communication with an external electronic apparatus using various wired or wireless communication methods, and for this, the communicator 210 may include a wireless communication module, a wired communication module, etc.

For example, the communicator 210 may perform communication with an external electronic apparatus through communication methods such as Wi-Fi based on AP (Wi-Fi, a wireless LAN network), Bluetooth, Zigbee, wired/wireless local area networks (LANs), a wide area network (WAN), Ethernet, IEEE 1394, a high-definition multimedia interface (HDMI), a universal serial bus (USB), thunderbolt, a mobile high-definition link (MHL), Audio Engineering Society/European Broadcasting Union (AES/EBU), optical, coaxial, etc.

The memory 220 may store various kinds of data necessary for the various embodiments of the disclosure. For example, the memory 220 may store various programs and data in accordance thereto for controlling or operating the electronic apparatus 200.

The memory 220 may be implemented in the form of a memory embedded in the electronic apparatus 200, or in the form of a memory that can be attached to or detached from the electronic apparatus 200, according to the usage of stored data. For example, in the case of data for operating the electronic apparatus 200, the data may be stored in a memory embedded in the electronic apparatus 200, and in the case of data for the extensive function of the electronic apparatus 200, the data may be stored in a memory that can be attached to or detached from the electronic apparatus 200.

In the case of a memory embedded in the electronic apparatus 200, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: a one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: a NAND flash or a NOR flash, etc.), a hard drive, or a solid state drive (SSD)). Also, in the case of a memory that can be attached to or detached from the electronic apparatus 100, the memory may be implemented in a form such as a memory card (e.g., a compact flash (CF), a secure digital (SD), a micro secure digital (Micro-SD), a mini secure digital (Mini-SD), an extreme digital (xD), a multi-media card (MMC), etc.) and an external memory that can be connected to a USB port (e.g., a USB memory), etc.

According to an embodiment of the disclosure, the memory 220 may be implemented as a single memory storing data generated in various operations according to the disclosure. However, depending on embodiments, the memory 220 may be implemented to include a plurality of memories.

The memory 220 may store a simulator 221. The simulator 221 may, for example, include a program for simulating driving of an object using a driving algorithm on a map, and may generate driving result data according to simulation.

The memory 220 may store information on an artificial intelligence model 222. According to an embodiment of the disclosure, the memory 220 may store information on an artificial intelligence model including a plurality of layers (e.g., a plurality of neural network layers).

The feature of storing information on an artificial intelligence model may refer, for example, to storing various kinds of information related to operations of an artificial intelligence model, for example, information on a plurality of layers included in an artificial intelligence model, information on the weights used in each of the plurality of layers, etc.

The processor 230 may include various processing circuitry and is electronically connected with the communicator 210 and the memory 220, and controls the overall operations of the electronic apparatus 100. The processor 230 may include, for example, one or a plurality of processors. The processor 230 may perform the operations of the electronic apparatus 100 according to the various embodiments of the disclosure by executing at least one instruction stored in the memory 220.

According to an embodiment of the disclosure, the processor 230 may include, for example, and without limitation, one or more of a central processing unit (CPU), a dedicated processor, a micro controller unit (MCU), a micro processing unit (MPU), a controller, a graphics processing unit (GPU), an artificial intelligence (AI) processor, a neural processing unit (NPU), an application processor (AP), or the like. The processor 230 may be implemented as a system on chip (SoC) having a processing algorithm stored therein or large scale integration (LSI), or in the forms of an application specific integrated circuit (ASIC) and a field programmable gate array (FPGA).

According to various example embodiments, the memory 220 including a ROM and a RAM and the processor 230 may be implemented inside the electronic apparatus 200 to be included inside the same chip.

The processor 230 for executing an artificial intelligence model according to an embodiment of the disclosure may include one or a plurality of processors. The one or plurality of processors may include generic-purpose processors such as CPUs, APs, etc., graphics-dedicated processors such as GPUs and vision processing units (VPUs), or artificial intelligence-dedicated processors such as NPUs. In this case, the one or plurality of processors may perform control to process input data according to predefined operation rules or an artificial intelligence model stored in the memory 220.

The processor 230 may obtain a map generated based on sensing data obtained by an external electronic apparatus (e.g., the electronic apparatus 100).

The sensing data obtained by the external electronic apparatus 100 may be data that the external electronic apparatus 100 obtained while running in a specific place, e.g., the place wherein the external electronic apparatus 100 is located.

In this case, when the sensing data is received from the external electronic apparatus 100 through the communicator 210 (refer to ① in FIG. 7A), the processor 230 may generate a map corresponding to the specific place based on the received sensing data.

The processor 230 may generate a map which is the same as the place wherein the external electronic apparatus 100 actually runs using the received sensing data.

As an example, the processor 230 may generate a map using a SLAM.

As another example, the processor 230 may generate a map using an artificial intelligence model. An artificial intelligence model may include, for example, an artificial intelligence model trained to generate a map based on sensing data when sensing data is input.

The feature of being made through training may refer, for example to predefined operation rules or an artificial intelligence model having desired characteristics being made by applying a training algorithm to a plurality of training data. Such training may be performed in an apparatus itself wherein artificial intelligence according to the disclosure is performed, or performed through a separate server/system.

Accordingly, the processor 230 may input the sensing data received from the external electronic apparatus 100 into an artificial intelligence model, and obtain data for a map.

The processor 230 may divide a map into a plurality of sections. For example, the processor 230 may identify a point wherein there is a dividing line or a raised spot on the bottom, a point wherein the movable width becomes narrow, a point wherein there is a wall, a point wherein a wall ends, a point wherein there is a door, etc. using images received from the external electronic apparatus 100, and divide a map into a plurality of sections with the identified points as boundaries between sections.

As described above, the processor 230 may receive the sensing data that the external electronic apparatus 100 obtained while running in the place wherein the external electronic apparatus 100 is actually located from the external electronic apparatus 100, and generate a map based on the received sensing data. Accordingly, the generated map may be a map that is the same as the actual driving environment of the external electronic apparatus 100, and may be used at the simulator 221.

According to various example embodiments, the external electronic apparatus 100 may transmit data for the map to the electronic apparatus 200. In this case, the processor 230 may receive the map transmitted from the external electronic apparatus 100 through the communicator 210.

The processor 230 may simulate driving of the external electronic apparatus 100 on the obtained map based on a plurality of parameter values and obtain driving result data for the plurality of parameter values. The processor 230 may train the artificial intelligence model 222 based on the plurality of parameter values and the driving result data and obtain a plurality of parameter values related to driving of the external electronic apparatus 100.

In this case, in the memory 220, a plurality of driving algorithms may have been stored. The processor 230 may determine a driving algorithm used at the external electronic apparatus 100 among a plurality of driving algorithms stored in the memory 220.

The processor 230 may identify the driving algorithm of the external electronic apparatus 100.

For example, depending on embodiments, driving algorithms used at the external electronic apparatus 100 may be different from one another according to types, manufacturers, models, etc., and parameters may also be different from one another for each driving algorithm.

Accordingly, when information on the driving algorithm of the external electronic apparatus 100 is received from the external electronic apparatus 100 through the communicator 210, the processor 230 may identify the driving algorithm of the external electronic apparatus 100 based on the received information. For this, in the memory 220, information on the driving algorithms for each electronic apparatus and parameters of the driving algorithms may have been stored.

The processor 230 may simulate driving of the external electronic apparatus 100 on the obtained map based on the plurality of parameter values of the plurality of identified parameters.

For example, the processor 230 may simulate driving of the external electronic apparatus 100 on the obtained map based on a plurality of parameter sets respectively including a plurality of parameter values, and obtain driving result data for each parameter set.

The plurality of parameter sets may include a first parameter set and a second parameter set wherein parameter values of at least one parameter are different.

For example, the parameter sets may include the parameter values of each of the plurality of parameters of the driving algorithm of the external electronic apparatus 100. In this case, the processor 230 may generate a plurality of parameter sets such that there are no parameter sets wherein all parameter values are the same with one another.

For example, a case wherein the driving algorithm of the external electronic apparatus 100 has parameters in an m number is assumed.

In this case, the processor 230 may generate parameter sets in an n number $P_1, P_2, \ldots, P_n$, respectively having parameter values of parameters in an m number (n is a natural number greater than or equal to 2).

The processor 230 may generate the first parameter set $P_1$ ($pi_{1,1}, p_{2,1}, \ldots, p_{m,1}$), the second parameter set $P_2$ ($p_{1,2}, p_{2,2}, \ldots, p_{m,2}$), ... the nth parameter set $P_n$ ($p_{1,n}, p_{2,n}, \ldots, P_{m,n}$). Here, $p_{1,1}, p_{1,2}, \ldots, P_{1,n}$ may be parameter values of the first parameter among the parameters in an m number of the driving algorithm, $p_{2,1}, p_{2,2}, \ldots, p_{2,n}$ may be parameter values of the second para meter among the parameters in an m number of the driving algorithm, and $p_{m,1}, p_{m,2}, \ldots, p_{m,n}$ may be parameter values of the mth parameter among the parameters in an m number of the driving algorithm.

Among the parameter sets in an n number, a parameter set wherein all parameter values are the same with one another does not exist. That is, the processor 230 may generate a plurality of parameter sets such that, among at least two parameter sets, parameter values different from one another are included in at least one parameter.

As described above, the processor 230 may generate a plurality of parameter sets different from one another.

The processor 230 may simulate driving of the external electronic apparatus 100 on the obtained map, and obtain driving result data for each parameter set. In this case, the processor 230 may use the simulator 221 (refer to ② in FIG. 7A).

The simulator 221 may refer, for example, to a program for simulating driving of an object using a driving algorithm on a map, and may generate driving result data according to simulation. In this case, an object may be implemented to have the same performance or specification as the external electronic apparatus 100 in a simulation environment.

For example, the processor 230 may execute the simulator 221, and generate a simulation environment wherein an object (or, a graphic object) corresponding to the external electronic apparatus 100 can run on the obtained map, and simulate driving of the external electronic apparatus 100 on the obtained map, and thereby obtain driving result data from the simulator 221.

In this case, the processor 230 may simulate driving of the object using the driving algorithm used at the external electronic apparatus 100 among the plurality of driving algorithms stored in the memory 220.

The processor 230 may set the plurality of parameter values of the plurality of parameters of the driving algorithm based on the plurality of parameter values included in each of the plurality of parameter sets, and perform simulation for the driving algorithm, and thereby obtain driving result data for each parameter set (refer to ③ in FIG. 7A).

For example, as described above, in the case of generating parameter sets in an n number, first, the processor 230 may set the plurality of parameter values of the plurality of parameters of the driving algorithm as the plurality of parameter values included in the first parameter set, and simulate driving of the object corresponding to the external electronic apparatus 100 on the map, and thereby obtain the first driving result data for the first parameter set.

The processor 230 may set the plurality of parameter values of the plurality of parameters of the driving algorithm as the plurality of parameter values included in the second parameter set, and simulate driving of the object corresponding to the external electronic apparatus 100 on the map, and thereby obtain the second driving result data for the second parameter set.

By repeating the aforementioned process sequentially, the processor 230 may set the plurality of parameter values of the plurality of parameters of the driving algorithm as the plurality of parameter values included in the nth parameter set, and simulate driving of the object corresponding to the external electronic apparatus 100 on the map, and thereby obtain the nth driving result data for the nth parameter set.

As described above, the processor 230 may obtain driving result data for each parameter set.

For example, the processor 230 may obtain the first driving result data $Q_1$ for the first parameter set $P_1$, obtain the second driving result data $Q_2$ for the second parameter set $P_2, \ldots$, and obtain the nth driving result data $Q_n$ for the nth parameter set $P_n$.

The driving result data may be data that can measure the performance of the driving algorithm.

For example, the driving result data may include at least one of the size of an area that an object corresponding to the external electronic apparatus 200 ran per unit time on the obtained map (or, the proportion of an area that an object ran per unit time with respect to the entire area of the map) (e.g., the size of an area that an object ran for one hour on the map, or the proportion of the size of an area that an object ran for one hour with respect to the entire area of the map), the size of an area that an object corresponding to the external electronic apparatus 200 repeatedly ran on the obtained map (e.g., the size of an area that an object ran at least two times on the map), or the time that was taken for an object corresponding to the external electronic apparatus 200 to run an area of a predetermined size on the obtained map (e.g., the time that was taken for an object to run 90% of the entire area of the map).

However, the driving result data as above is merely an example, and the simulator 221 may generate data in various types that can indicate the performance of a driving algorithm and data which is a combination thereof as driving result data.

The processor 230 may train the artificial intelligence model 222 based on the plurality of parameter values and the obtained driving result data and thereby obtain a plurality of parameter values related to the driving of the external electronic apparatus 100 (refer to ④ and ⑤ in FIG. 7A).

For example, the processor 230 may train the artificial intelligence model 222 based on each of the plurality of parameter sets and driving result data obtained for each parameter set, and thereby obtain a plurality of parameter values related to the driving of the external electronic apparatus 100.

The artificial intelligence model 222 may be trained using each of the plurality of parameter sets and driving result data for each parameter set as training data. Specifically, the artificial intelligence model 222 may be trained using each of the plurality of parameter sets and driving result data for each parameter set as input data and output data.

For example, a case wherein the processor 230 performed simulation based on parameter sets in an n number (e.g., $P_1, P_2, \ldots, P_n$), and obtained driving result data in an n number corresponding thereto $(Q_1, Q_2, \ldots, Q_n)$ as a result is assumed. In this case, the training data of the artificial intelligence model is as $(P_1, Q_1), (P_2, Q_2), \ldots, (P_n, Q_n)$.

In the plurality of neural network layers of the artificial intelligence model 222, weights included in each of the plurality of neural network layers may be trained based on the plurality of parameter sets and the driving result data obtained for each of the plurality of parameter sets. Being trained may refer, for example, to a basic artificial intelligence model being trained using a plurality of training data by a learning algorithm, and predefined operation rules or an artificial intelligence model set to perform desired characteristics (or, a purpose) are made.

Weights of each neural network layer included in a basic artificial intelligence model may be random values, but are not limited thereto, and they may be weights trained with basic training data.

As described above, in a process wherein weights included in each of the plurality of neural network layers are trained, a plurality of parameter values corresponding to the trained weights may be obtained from an input layer among the plurality of neural network layers. For example, as weights are trained, the processor 230 may obtain a plurality of parameter values from an input layer among the plurality of neural network layers.

The plurality of obtained parameter values may be a plurality of parameter values (e.g., parameter sets including a plurality of parameter values) that make the driving result data optimal.

For example, a case wherein driving result data is data indicating the size of an area that an object ran per unit time on a map is assumed. In this case, a plurality of parameter values obtained through a learning process may be a plurality of parameter values that make an object run, for example, the widest area per unit time.

As another example, a case wherein driving result data is data indicating the size of an area that an object repeatedly ran on a map is assumed. In this case, a plurality of parameter values obtained through a learning process may be a plurality of parameter values that make an object run such that the size of the area that the object repeatedly ran is the biggest.

As still another example, a case wherein driving result data is data indicating the time that was taken for an object to run an area of a predetermined size on a map is assumed. In this case, a plurality of parameter values obtained through a learning process may be a plurality of parameter values that make an object run an area of a predetermined size within the shortest time period.

In the process of learning weights included in the plurality of neural network layers of the artificial intelligence model, a back propagation technology may be used. Through such back propagation, the processor 230 may obtain a plurality of parameter values from an input layer. The plurality of parameter values obtained from an input layer may be optimal parameter values.

Back propagation may refer, for example, to a process of finding an optimal training result while propagating errors backward.

For example, in back propagation, an input is transmitted to a final output end, and an error (e.g., the difference between the actual output and the expected output) and a cost function are obtained at the final output end. The cost function may be, for example, inputting training data into an artificial intelligence model, and obtaining a mean square error (MSE) with respect to the difference between the actual output and the expected output.

In this case, repeatedly performing a process of changing a weight w and a bias b of the plurality of neural network layers using training data and thereby making a cost function a minimum value may be the learning process of the artificial intelligence model.

As the cost function includes a function of a weight and a bias, partial differentiation for the cost function may be sequentially obtained starting from the output portion to the input side, e.g., in a reverse direction, and the weight and the bias value may be updated using the obtained partial differentiation value. By repeatedly performing such a task for all training data, a weight and a bias value optimized for training data may be obtained.

Back propagation may refer, for example, to updating a weight and a bias value by performing partial differentiation sequentially in a reverse direction from an output as described above, and in this process, optimal input data wherein input data has been updated in an input end, e.g., an input layer may be obtained. Here, according to an embodiment of the disclosure, data obtained in an input layer may be a plurality of optimal parameter values.

Figure 8:
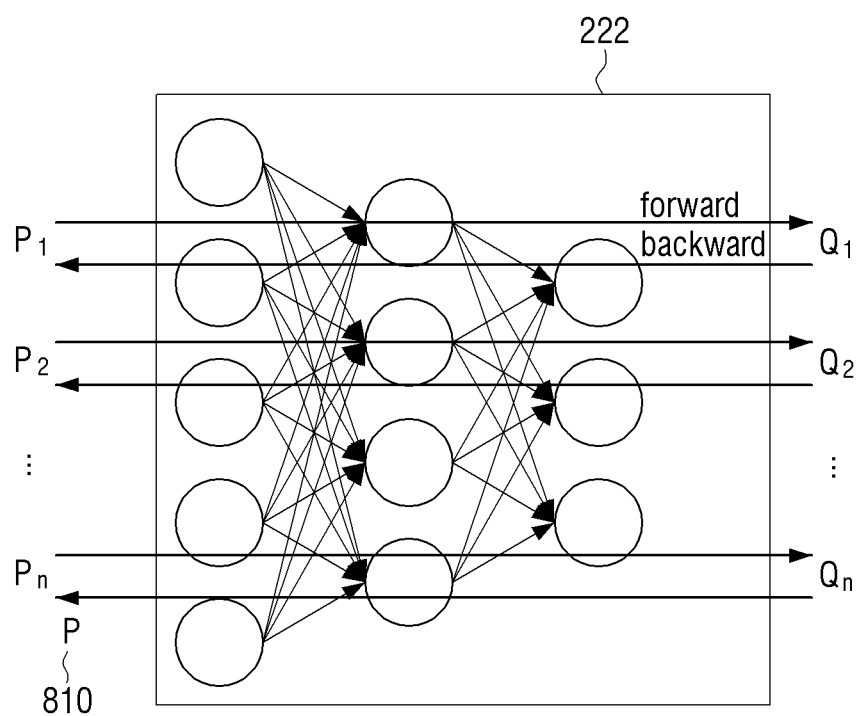
FIG. 8 is a diagram illustrating an example of obtaining a plurality of parameter values through training of an artificial intelligence model according to an embodiment of the disclosure.

FIG. 8 is a diagram illustrating an example of obtaining a plurality of parameter values through training of an artificial intelligence model according to an embodiment of the disclosure.

Referring to FIG. 8, the processor 230 may train the artificial intelligence model 222 using training data $(P_1, Q_1)$, $(P_2, Q_2), \ldots, (P_n, Q_n)$. Accordingly, the processor 230 may obtain a parameter set P 810 including a plurality of optimal parameter values through back propagation.

The processor 230 may transmit the plurality of obtained parameter values to the external electronic apparatus 100 through the communicator 210 (refer to ⑥ in FIG. 7A).

For example, for making the external electronic apparatus 100 update the plurality of parameter values of the driving algorithm, the processor 230 may transmit the plurality of obtained parameter values to the external electronic apparatus 100 through the communicator 210.

As described above, the processor 230 may simulate driving in the entire area of the map while changing the plurality of parameter values, and train the artificial intelligence model using the plurality of parameter values and the driving result data obtained according to simulation and thereby obtain a plurality of parameter values for updating the driving algorithm of the external electronic apparatus 100, and transmit the plurality of obtained parameter values to the external electronic apparatus 100.

In the aforementioned example, it was described that driving result data for each of the plurality of parameter sets are obtained through driving for the entire area of the map, but this is merely an example.

For example, the processor 230 may simulate driving while changing the plurality of parameter values in each of the plurality of sections included in the map and obtain driving result data for each section, and train the artificial intelligence model using the plurality of parameter values and the driving result data obtained according to simulation and thereby obtain a plurality of parameter values for each section, and transmit the plurality of parameter values for each of the plurality of sections to the external electronic apparatus 100.

Figure 9A:
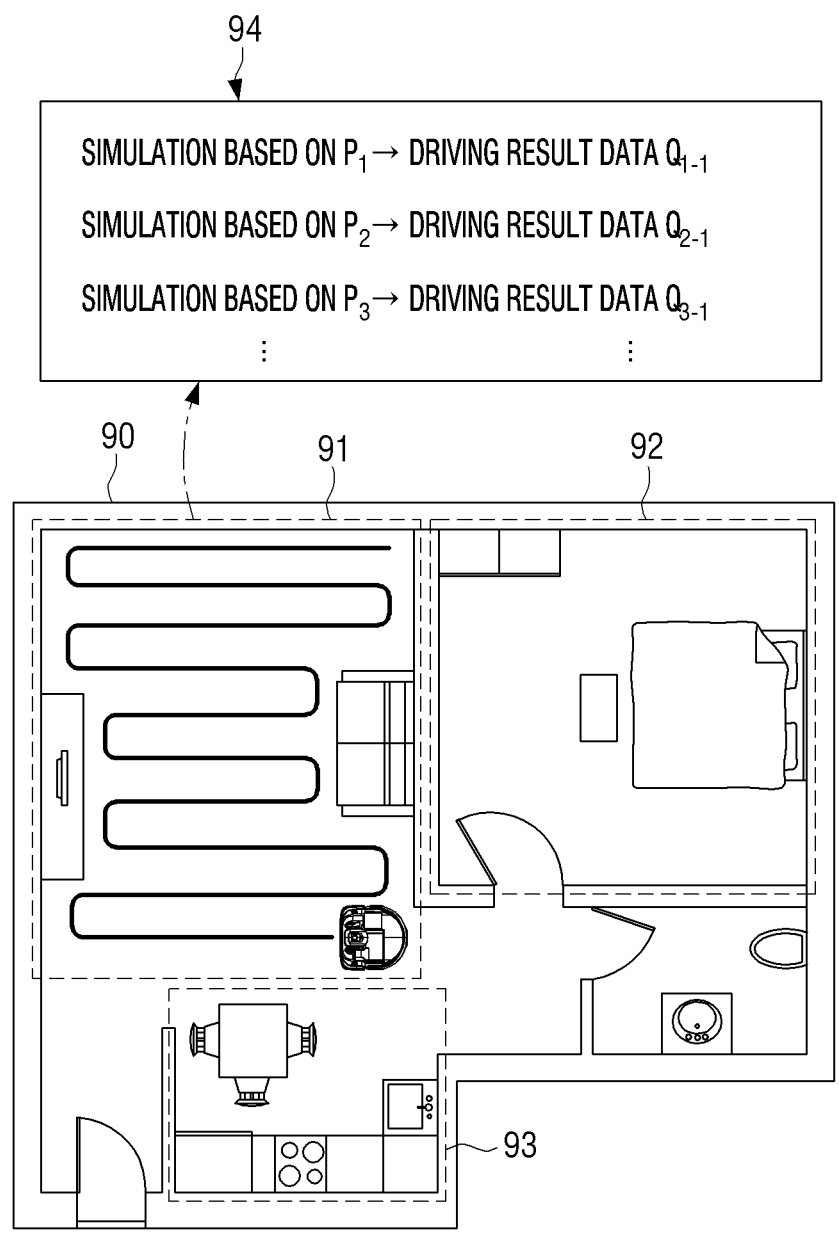
FIG. 9A is a diagram illustrating an example method of obtaining training data for each section of a map according to an embodiment of the disclosure.

For example, as illustrated in FIG. 9A, the processor 230 may simulate driving of an object corresponding to the external electronic apparatus 100 in the first area 91 included in the map 90 for simulation. For example, the processor 230 may set the plurality of parameter values of the driving algorithm respectively as the plurality of parameter values included in each of the plurality of parameter sets and simulate driving of the object in the first area 91 a plurality of times.

Accordingly, with respect to the first area 91, the processor 230 may obtain driving result data $Q_{1-1}$ for the first parameter set $P_1$, obtain driving result data $Q_{2-1}$ for the second parameter set $P_2, \ldots,$ and obtain driving result data $Q_{n-1}$ for the nth parameter set $P_n$, (94 in FIG. 9A).

For example, the processor 230 may obtain driving result data $Q_{1-1}$ by simulating using the first parameter set $P_1$, obtain driving result data $Q_{2-1}$ by simulating using the second parameter set $P_2, \ldots,$ and obtain driving result data $Q_{n-1}$ by simulating using the nth parameter set $P_n$ (94 in FIG. 9A).

Figure 9B:
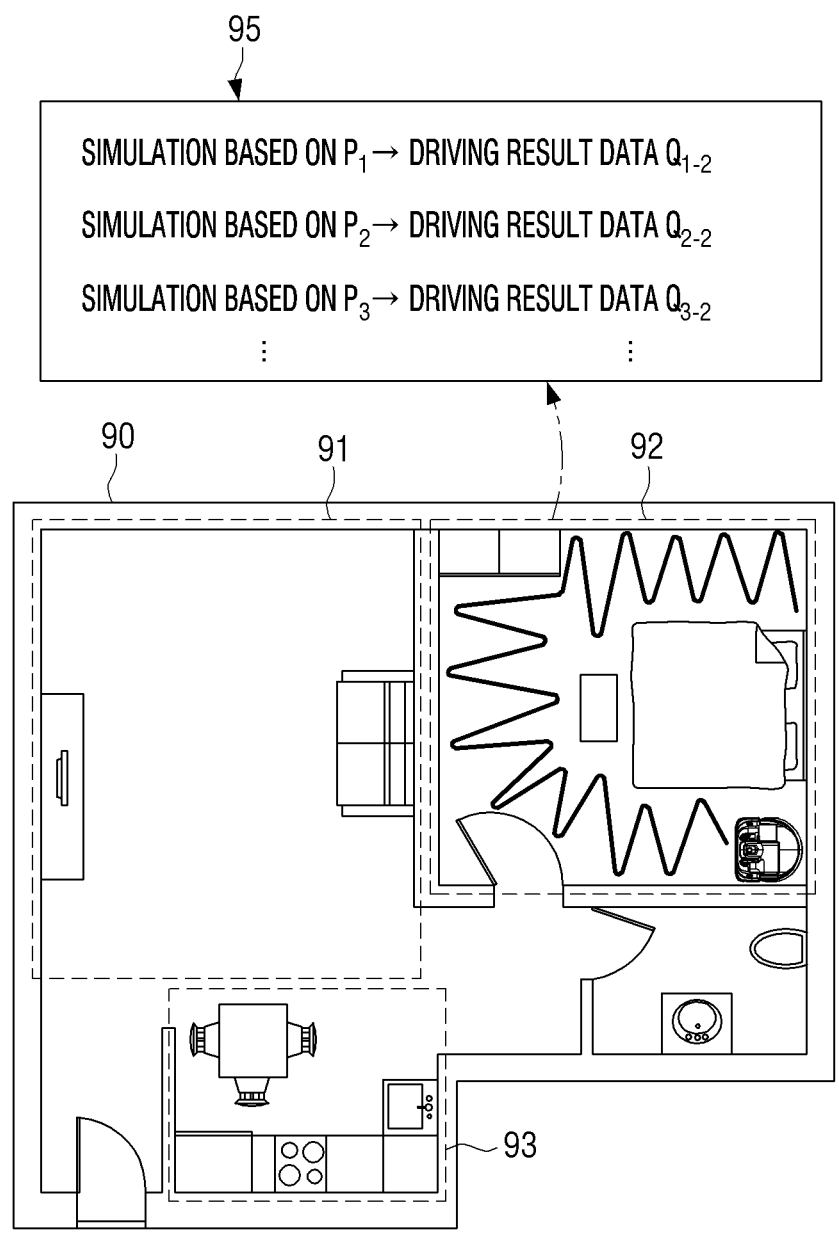
FIG. 9B is a diagram illustrating an example method of obtaining training data for each section of a map according to an embodiment of the disclosure.

Referring to FIG. 9B, the processor 230 may simulate driving of an object corresponding to the external electronic apparatus 100 in the second area 92 included in the map 90. For example, the processor 230 may set the plurality of parameter values of the driving algorithm respectively as the plurality of parameter values included in each of the plurality of parameter sets and simulate driving of the object in the second area 92 a plurality of times.

Accordingly, with respect to the second area 92, the processor 230 may obtain driving result data $Q_{1-2}$ for the first parameter set $P_1$, obtain driving result data $Q_{2-2}$ for the second parameter set $P_2, \ldots,$ and obtain driving result data $Q_{n-2}$ for the nth parameter set $P_n$ (95 in FIG. 9B).

For example, the processor 230 may obtain driving result data $Q_{1-2}$ by simulating using the first parameter set $P_1$, obtain driving result data $Q_{2-2}$ by simulating using the second parameter set $P_2, \ldots,$ and obtain driving result data $Q_{n-2}$ by simulating using the nth parameter set $P_n$ (94 in FIG. 9A).

By repeating such a process sequentially, the processor 230 may obtain driving result data for each section.

The processor 230 may train the artificial intelligence model using training data for each section, and obtain a plurality of parameter values for each of the plurality of sections.

The processor 230 may train the artificial intelligence model using each of the plurality of parameter sets and driving result data for each parameter set, and obtain a plurality of parameter values for each section.

The processor 230 may identify each of the plurality of sections included in the map. In this case, information on each section (e.g., the name, the use, etc.) may be received from an external apparatus.

For example, the processor 230 may transmit information on the map 910 divided into a plurality of sections to the external apparatus 900 through the communicator 210.

Figure 9C:
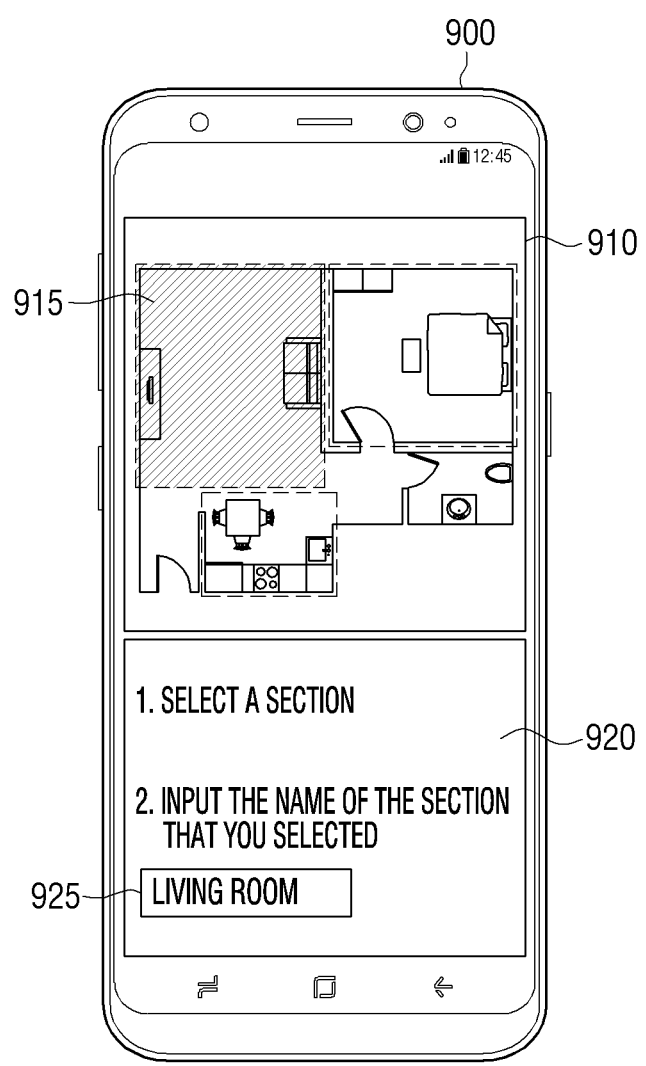
FIG. 9C is a diagram illustrating an example method of obtaining training data for each section of a map according to an embodiment of the disclosure.

Referring to FIG. 9C, the external apparatus 900 may display the map 910 received from the electronic apparatus 200 and a graphic user interface (GUI) 925 that can input the name of a section selected on the map on the display of the external apparatus 900.

When one section 915 among the plurality of sections included in the map 910 is selected by a user, and the name of the selected section (e.g., the living room) is input into the GUI 925, the external apparatus 900 may transmit information on the selected section 915 and information on the input name to the electronic apparatus 200.

Accordingly, the processor 230 may receive the information from the external apparatus 900 through the communicator 210, and identify each section using the names of each of the plurality of sections, etc. included in the map.

The processor 230 may transmit information on each of the plurality of sections included in the map (e.g., the name, the use) and the parameter sets for each of the plurality of sections to the external electronic apparatus 100 through the communicator 210.

Accordingly, the external electronic apparatus 100 may determine a parameter set corresponding to the area wherein it is located using the information received from the electronic apparatus 200, and move in the section using the plurality of parameter values included in the determined parameter set.

The aforementioned operation of the processor 230 may be performed by a module stored in the memory 220.

Figure 7B:
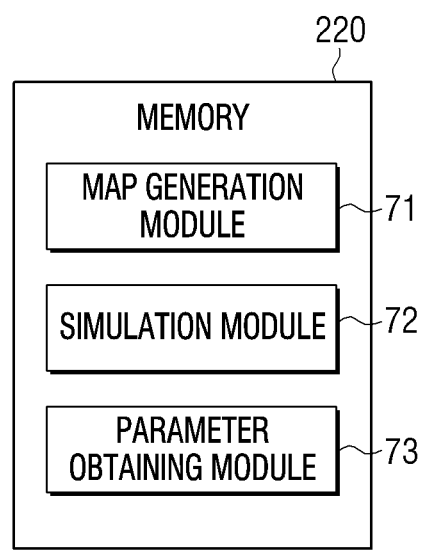
FIG. 7B is a diagram illustrating an example software configuration of an electronic apparatus according to an embodiment of the disclosure.

For example, referring to FIG. 7B, in the memory 220, a map generation module (e.g., including processing circuitry and/or executable program elements) 71, a simulation module (e.g., including processing circuitry and/or executable program elements) 72, and a parameter obtaining module (e.g., including processing circuitry and/or executable program elements) 73 may be stored. These modules may be implemented as software, and executed by the processor 230. For example, the processor 230 may load the map generation module 71, the simulation module 72, and the parameter obtaining module 73 stored in the memory 220 on the RAM, and execute instructions corresponding to the modules according to a set order.

The map generation module 71 may include various processing circuitry and/or executable program elements and generate a map using sensing data received from the external electronic apparatus 100.

The simulation module 72 may include various processing circuitry and/or executable program elements and drive an object in a simulation environment including a map, and obtain driving result data.

The simulation module 72 may set the parameter values of the plurality of parameters of the driving algorithm used at the external electronic apparatus 100 as the parameter values of each of the plurality of parameter sets, and perform simulation of the driving algorithm, and thereby obtain driving result data for each of the plurality of parameter sets.

The parameter obtaining module 73 may include various processing circuitry and/or executable program elements and train an artificial intelligence model using each of the plurality of parameter sets and driving result data corresponding thereto as training data, and thereby obtain a plurality of parameter values of the driving algorithm of the external electronic apparatus 100.

Figure 10:
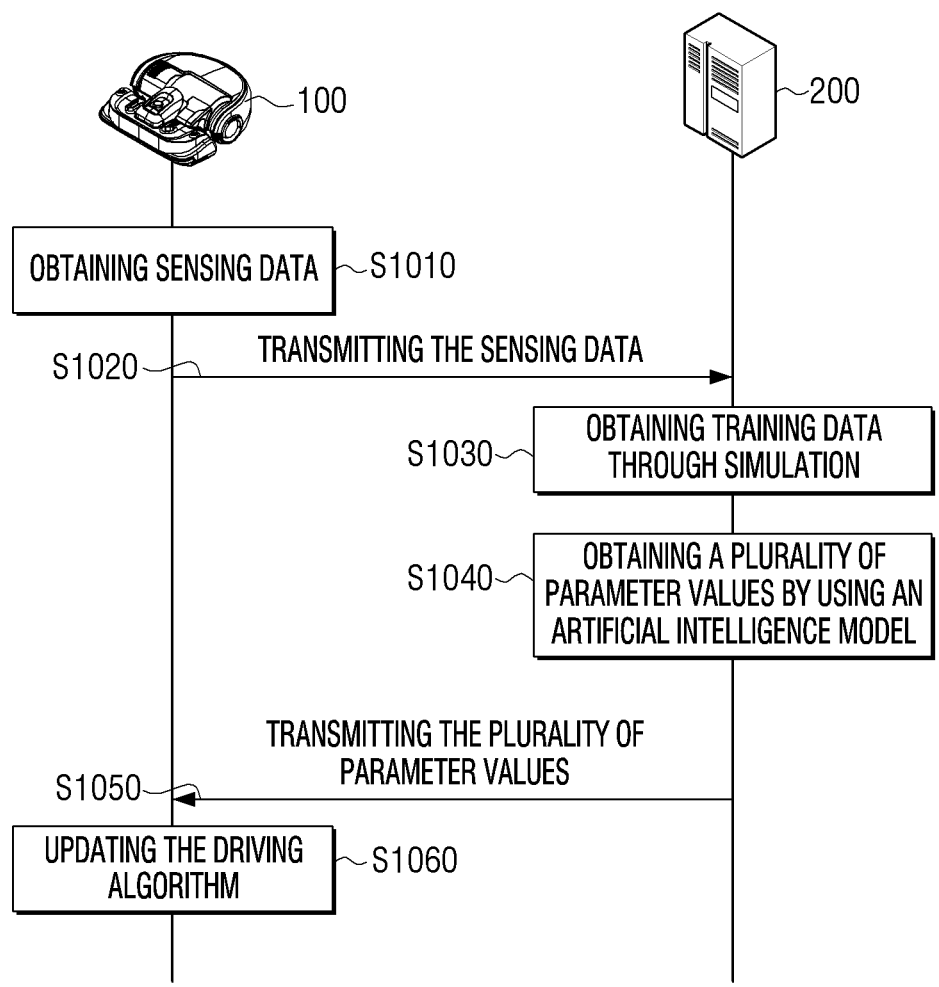
FIG. 10 is a signal flow diagram illustrating an example method of updating the driving algorithm of an electronic apparatus according to an embodiment of the disclosure.

FIG. 10 is a signal flow diagram illustrating an example method of updating the driving algorithm of an electronic apparatus according to an embodiment of the disclosure.

Referring to FIG. 10, the electronic apparatus 100 may obtain sensing data at operation S1010, and transmit the obtained sensing data to the electronic apparatus 200 at operation S1020.

The electronic apparatus 200 may generate a map which is identical to the place wherein the electronic apparatus 100 actually runs using the sensing data received from the electronic apparatus 100, and drive an object corresponding to the electronic apparatus 100 on the map through simulation, and thereby obtain training data at operation S1030.

The electronic apparatus 200 may train an artificial intelligence model using training data, and obtain a plurality of parameter values at operation S1040, and transmit the plurality of parameter values obtained from the artificial intelligence model to the electronic apparatus 100 at operation S1050.

The electronic apparatus 100 may update the driving algorithm using the plurality of parameter values received from the electronic apparatus 200 at operation S1060.

In the aforementioned example, it was described that the plurality of parameter values of the driving algorithm of the electronic apparatus 100 have the initial value set at the time of manufacture, but this is merely an example.

Depending on embodiments, the plurality of parameter values of the driving algorithm of the electronic apparatus 100 may be set as values obtained in consideration of the driving environment of the electronic apparatus 100 from the time of manufacture of the electronic apparatus 100, and this will be described in more detail below.

Figure 11:
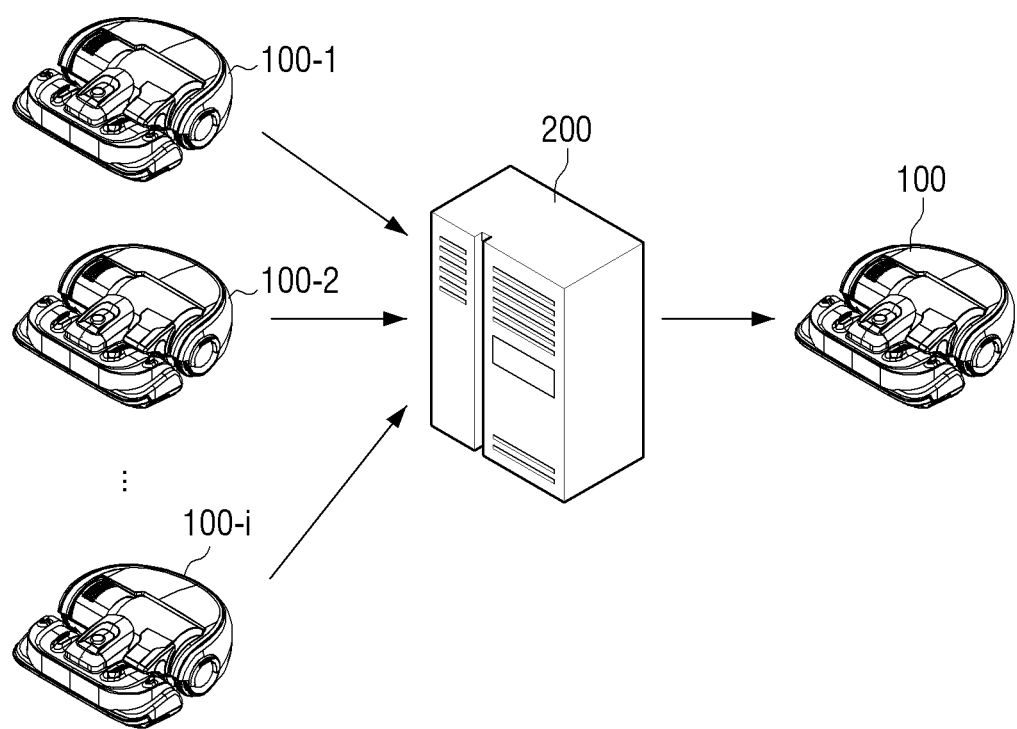
FIG. 11 is a diagram illustrating an example method of setting a plurality of parameter values of an electronic apparatus in a manufacturing process of an electronic apparatus according to an embodiment of the disclosure.

FIG. 11 is a diagram illustrating an example method of setting a plurality of parameter values of an electronic apparatus in a manufacturing process of an electronic apparatus according to an embodiment of the disclosure.

Referring to FIG. 11, the plurality of electronic apparatuses 100-1, 100-2, . . . , 100-i may perform operations identical to or similar to the operations that the electronic apparatus 100 performs in FIGS. 4A, 4B, 5A, 5B and 6, and may include the same or similar components as the electronic apparatus 100.

The plurality of electronic apparatuses 100-1, 100-2, . . . , 100-i may respectively run the places wherein they are located, and transmit sensing data obtained during running to the electronic apparatus 200.

In this case, additionally, the plurality of electronic apparatuses 100-1, 100-2, . . . , 100-i may transmit information on the places wherein they are located to the electronic apparatus 200.

Information on places may include information on the countries wherein each electronic apparatus 100-1, 100-2, . . . , 100-i is located and information on the types of places wherein each electronic apparatus 100-1, 100-2, . . . , 100-i is located.

The types of places may be types of houses such as apartments, detached houses, villas, etc.

In this case, a user of each electronic apparatus 100-1, 100-2, . . . , 100-i may input corresponding information into each electronic apparatus 100-1, 100-2, . . . , 100-i. For example, a user may select a button, etc. provided on the manipulation inputter of each electronic apparatus 100-1, 100-2, . . . , 100-i, and input information on the countries and types of places wherein each electronic apparatus 100-1, 100-2, . . . , 100-i is located.

As another example, a user may input corresponding information through another electronic apparatus connected with each electronic apparatus 100-1, 100-2, ..., 100-i through a network.

Figure 12:
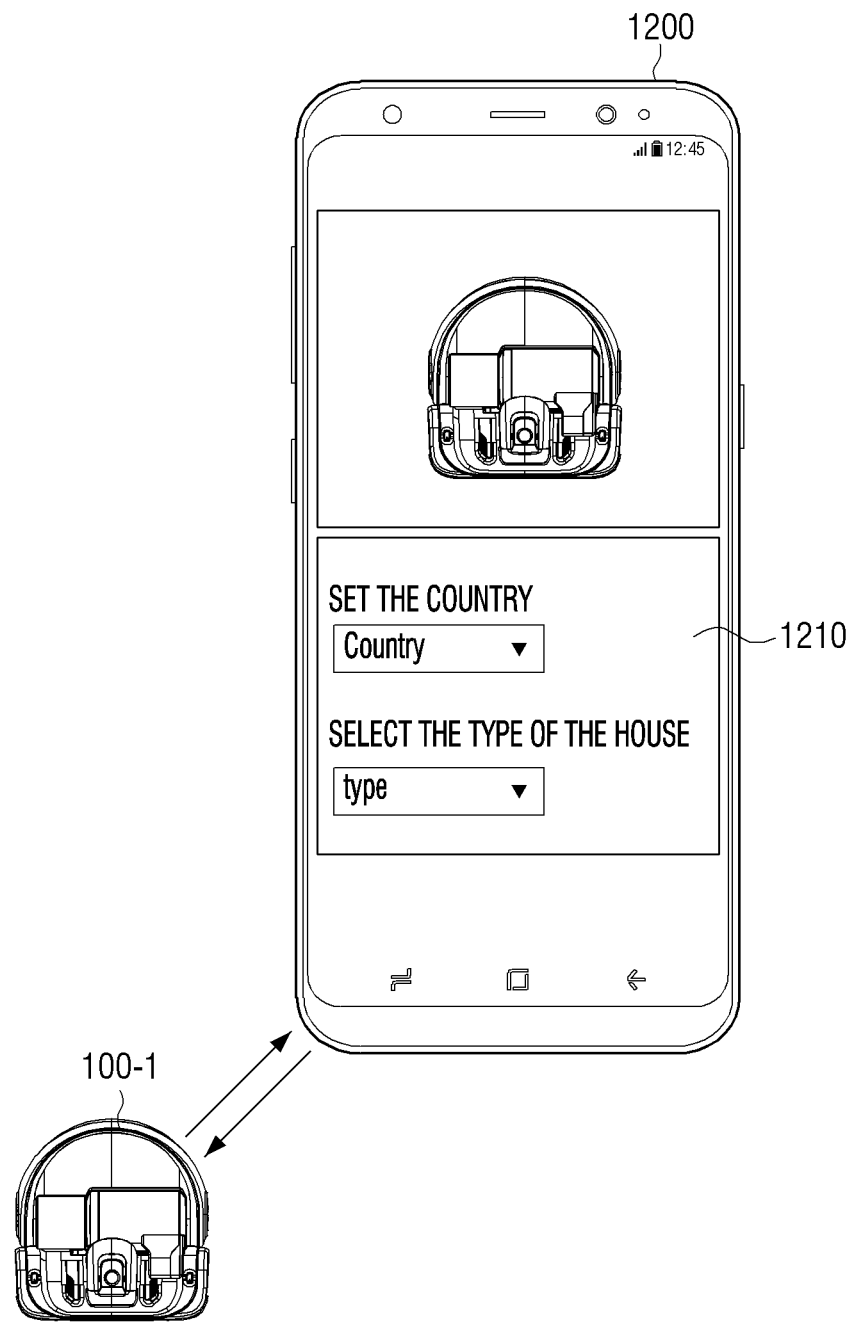
FIG. 12 is a diagram illustrating an example method for inputting information on a place according to an embodiment of the disclosure.

For example, Referring to FIG. 12, the portable terminal 1200 connected with the electronic apparatus 100-1 through a network may display a user interface 1210 which can input information on the electronic apparatus 100-1.

Accordingly, the portable terminal 1200 may input information on the country and the type of the place wherein the electronic apparatus 100-1 is located through the user interface 1210. In this case, the portable terminal 1200 may transmit the input information to the electronic apparatus 100-1, and the processor of the electronic apparatus 100-1 may transmit the information received from the portable terminal 1200 to the electronic apparatus 200 through the communicator.

In this case, when information on the countries and the types of places wherein the plurality of electronic apparatuses 100-1, 100-2, ..., 100-i are located is received, the electronic apparatus 200 may obtain a plurality of parameter values for the electronic apparatus 100 using the information.

The processor 230 may generate a map for each electronic apparatus 100-1, 100-2, ..., 100-i based on the sensing data received from the electronic apparatuses 100-1, 100-2, ..., 100-i, and perform simulation based on the generated map, and obtain training data for each electronic apparatus 100-1, 100-2, ..., 100-i.

As the process of obtaining training data through simulation is identical to or similar to the aforementioned method, detailed overlapping explanation may not be repeated here.

The processor 230 may classify the training data based on information on the countries and the types of places received from the plurality of electronic apparatuses 100-1, 100-2, ..., 100-i.

For example, the processor 230 may classify the training data into a plurality of groups such that training data for electronic apparatuses of the same country and the places of the same type belong to the same group.

For example, in case both of the electronic apparatus 100-1 and the electronic apparatus 100-2 are located in apartments in Korea, training data for the electronic apparatus 100-1 and the electronic apparatus 100-2 may be classified in the same group.

The processor 230 may train the artificial intelligence model using the training data belonging to each of the plurality of groups, and thereby obtain a plurality of parameter values corresponding to each group.

For example, as described above, in case training data for the electronic apparatus 100-1 and the electronic apparatus 100-2 belong to the same group, the processor 230 may train the artificial intelligence model using the training data for the electronic apparatus 100-1 and the training data for the electronic apparatus 100-2, and obtain a plurality of parameter values from the artificial intelligence model.

Accordingly, the processor 230 may obtain a plurality of parameter values corresponding to each group.

The processor 230 may determine a group corresponding to the driving environment of the electronic apparatus 100 among the plurality of groups in consideration of the driving environment wherein the electronic apparatus 100 will be located, and transmit the plurality of parameter values corresponding to the determined group to the electronic apparatus 100.

In this case, the processor 230 may determine the driving environment of the electronic apparatus 100 based on the country wherein the electronic apparatus 100 will be sold and regions of the country, etc.

For example, in case the electronic apparatus 100 is going to be sold in a region wherein there are a lot of apartments in Korea, the processor 230 may transmit the plurality of parameter values obtained by the training data of the group corresponding to apartments in Korea to the electronic apparatus 100.

However, this is merely an example, and the processor 230 may determine a plurality of parameter values to be transmitted to the electronic apparatus 100 based on a user command input into the electronic apparatus 200. That is, a user may select a plurality of parameter values to be transmitted to the electronic apparatus 100 in consideration of the driving environment of the region wherein the electronic apparatus 100 will be sold.

When a plurality of parameter values are received from the electronic apparatus 200, the electronic apparatus 100 may update the driving algorithm of the electronic apparatus 100 using the plurality of received parameter values.

As described above, according to an embodiment of the disclosure, even in the case of places of the same type in the same country, the places do not have the same structure or shape. However, it can be deemed that the places have somewhat similar structures or shapes depending on the culture, etc., and thus the electronic apparatus 200 may obtain a plurality of parameter values for each driving environment in consideration of driving environments of a plurality of electronic apparatuses, and through this, update the driving algorithm of the electronic apparatus 100 in the manufacturing process of the electronic apparatus 100.

Figure 13:
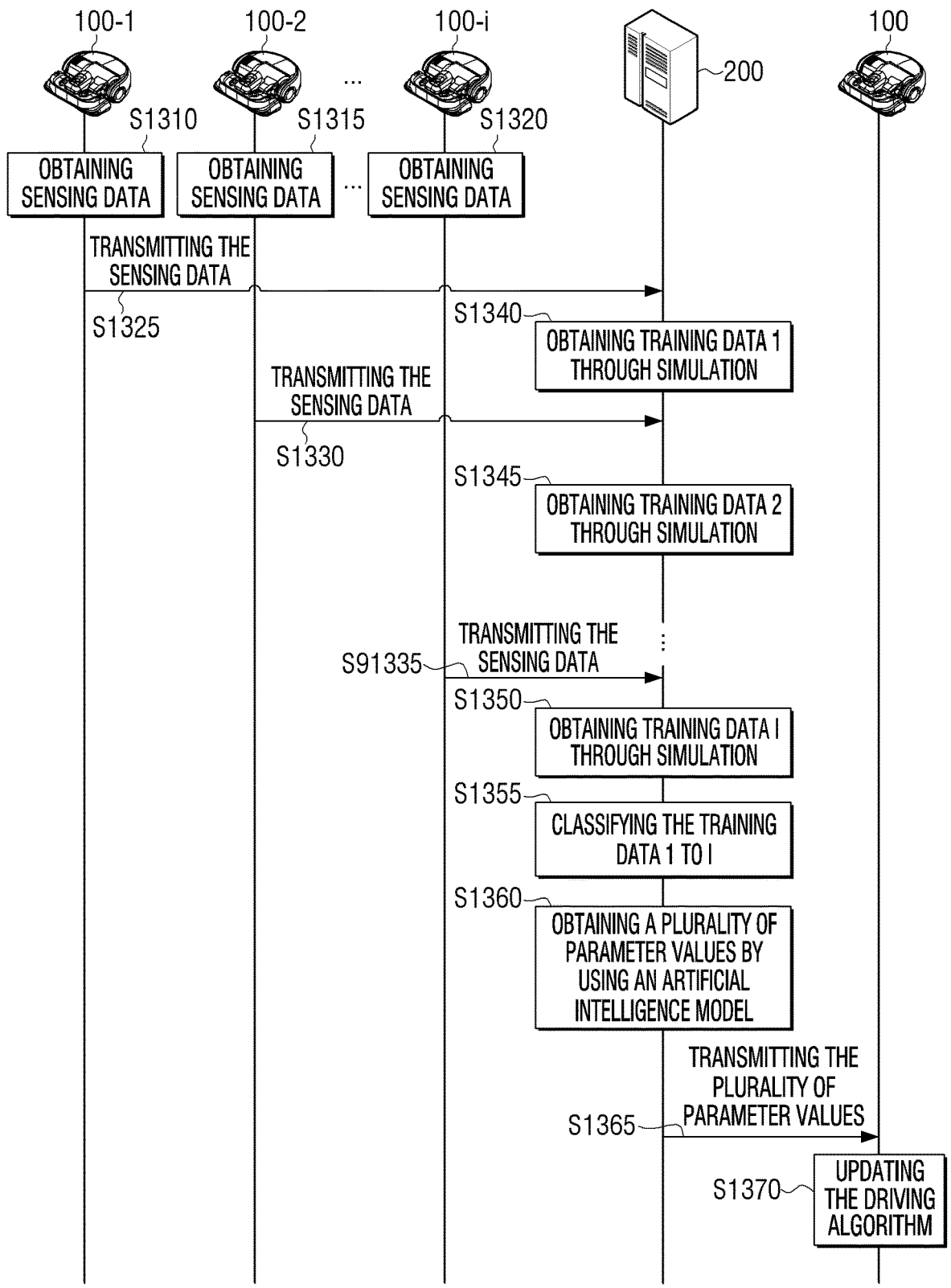
FIG. 13 is a signal flow diagram illustrating an example method of updating the driving algorithm of an electronic apparatus according to an embodiment of the disclosure.

FIG. 13 is a signal flow diagram illustrating an example method of updating the driving algorithm of an electronic apparatus according to an embodiment of the disclosure.

Referring to FIG. 13, the plurality of electronic apparatuses 100-1, 100-2, ..., 100-i may respectively obtain sensing data at operations S1310, S1315, and S1320, and transmit each of the obtained sensing data to the electronic apparatus 200 at operations S1325, S1330, and S1335. In this case, each electronic apparatus 100-1, 100-2, ..., 100-i may also transmit information on the places wherein each electronic apparatus 100-1, 100-2, ..., 100-i is located to the electronic apparatus 200.

The electronic apparatus 200 may perform simulation for each electronic apparatus using the sensing data received from the plurality of electronic apparatuses 100-1, 100-2, ..., 100-i, and obtain training data for each electronic apparatus (e.g., training data 1 to i) at operations S1340, S1345, and S1350.

The electronic apparatus 200 may classify the training data at operation S1355. For example, the electronic apparatus 200 may classify the training data 1 to the training data i into a plurality of groups based on the information on places received from the plurality of electronic apparatuses 100-1, 100-2, ..., 100-i. Accordingly, training data for electronic apparatuses of the same country and places of the same type may be classified in the same group.

electronic apparatus 200 may train the artificial intelligence model using the training data belonging to each group, and thereby obtain a plurality of parameter values at operation S1360.

The electronic apparatus 200 may determine a plurality of parameter values to be transmitted to the electronic apparatus 100, and transmit the parameter values to the electronic apparatus 100 at operation S1365. In this case, the electronic apparatus 100 may update the driving algorithm using the plurality of parameter values received from the electronic apparatus 200 at operation S1370.

In the aforementioned embodiment, it was described that the electronic apparatus 100 according to an embodiment of the disclosure is implemented as a robot cleaner, but this is merely an example, and the electronic apparatus 100 may be implemented as robots in various types such as an assistant robot, a retail robot, etc. moving in a specific place by themselves according to a driving algorithm.

Figure 14A:
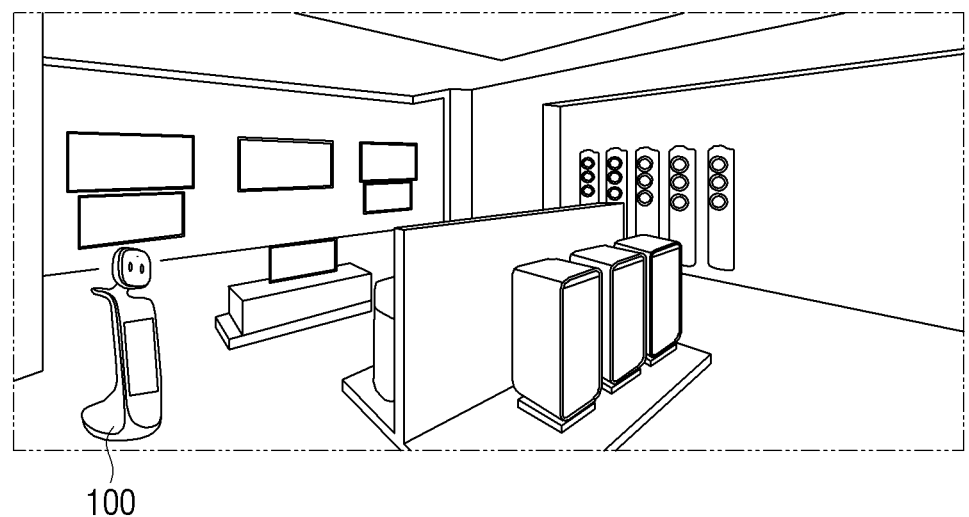
FIG. 14A is a diagram illustrating an example of an electronic apparatus according to an embodiment of the disclosure.
Figure 14B:
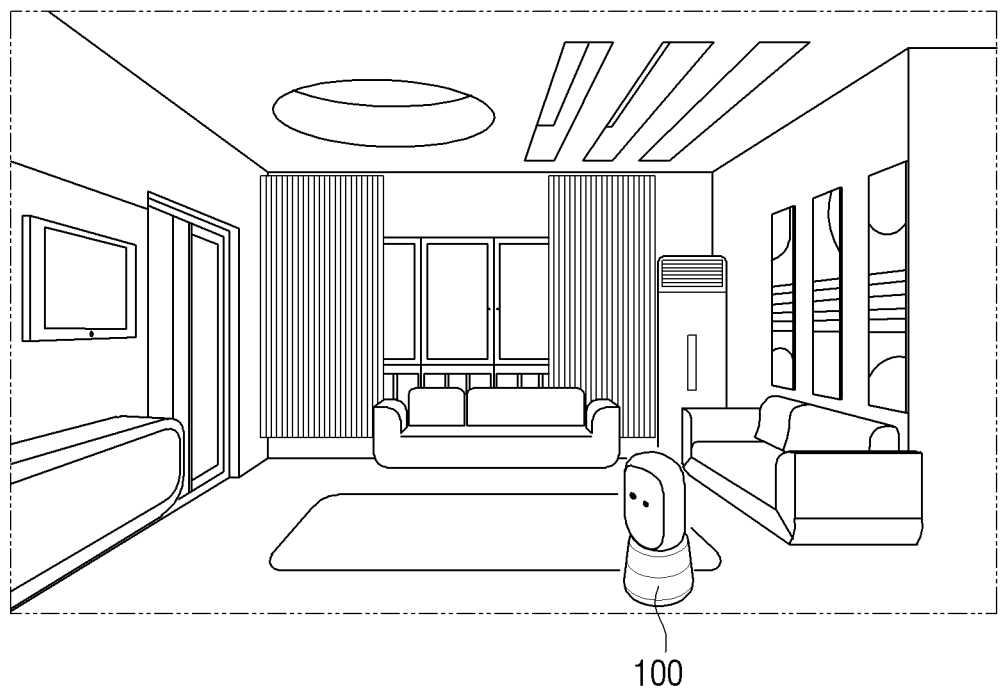
FIG. 14B is a diagram illustrating an example of an electronic apparatus according to an embodiment of the disclosure.

FIGS. 14A and 14B are diagrams illustrating example implementations of an electronic apparatus according to an embodiment of the disclosure.

Referring to FIG. 14A, the electronic apparatus 100 according to an embodiment of the disclosure may be implemented as a retail robot 100.

The retail robot 100 may be located in retail shops such as a shopping mall, a restaurant, a merchandise shop, etc. The retail robot 100 may include a microphone and a speaker, and receive a voice uttered by a user, and recognize the received voice and provide a response thereto. The retail robot 100 may perform the function of receiving an order or proceeding with payment.

The retail robot 100 may move in a retail shop. For example, if it is determined that a user voice for inquiring about a specific product has been input, or a gesture of a user pointing a specific product has been recognized in an image obtained through the camera, the retail robot 100 may move to the product.

In this case, the retail robot 100 may apply sensing data obtained through the sensor 110 to the driving algorithm and obtain a control signal, and move in a retail shop according to the control signal.

Referring to FIG. 14B, the electronic apparatus 100 according to an embodiment of the disclosure may be implemented as an assistant robot 100.

The assistant robot 100 may be located in a house. The assistant robot 100 may include a microphone and a speaker, and receive a voice uttered by a user, and recognize the received voice and provide a response thereto. The assistant robot 100 may be connected with other electronic apparatuses located in the house, e.g., a television, a washing machine, a refrigerator, etc. through a network and control the electronic apparatuses.

If it is determined that a user voice for moving the assistant robot 100 has been received, the assistant robot 100 may apply sensing data obtained through the sensor 110 to the driving algorithm and obtain a control signal from the driving algorithm, and move in the house according to the control signal.

As described above, in a case wherein the electronic apparatus 100 is implemented as a retail robot or an assistant robot, the electronic apparatus 100 may transmit sensing data obtained during running to the electronic apparatus 200, and update the driving algorithm using the plurality of parameter values received from the electronic apparatus 200.

An artificial intelligence model in the disclosure may include a plurality of neural network layers. Each layer has a plurality of weight values, and performs an operation of the layer through the operation result of the previous layer and an operation of the plurality of weight values. As examples of a neural network, there are, for example, and without limitation, a convolutional neural network (CNN), a deep neural network (DNN), a recurrent neural network (RNN), a restricted Boltzmann machine (RBM), a deep belief network (DBN), a bidirectional recurrent deep neural network (BRDNN), deep Q-networks, or the like, but the neural network in the disclosure is not limited to the aforementioned examples excluding specified cases.

A learning algorithm may refer, for example, to a method of training a specific subject apparatus (e.g., a robot) using a plurality of training data and making the specific subject apparatus make a decision or make a prediction by itself. As examples of learning algorithms, there are supervised learning, unsupervised learning, semi-supervised learning, or reinforcement learning, but the learning algorithm in the disclosure is not limited to the aforementioned examples excluding specified cases.

Figure 15:
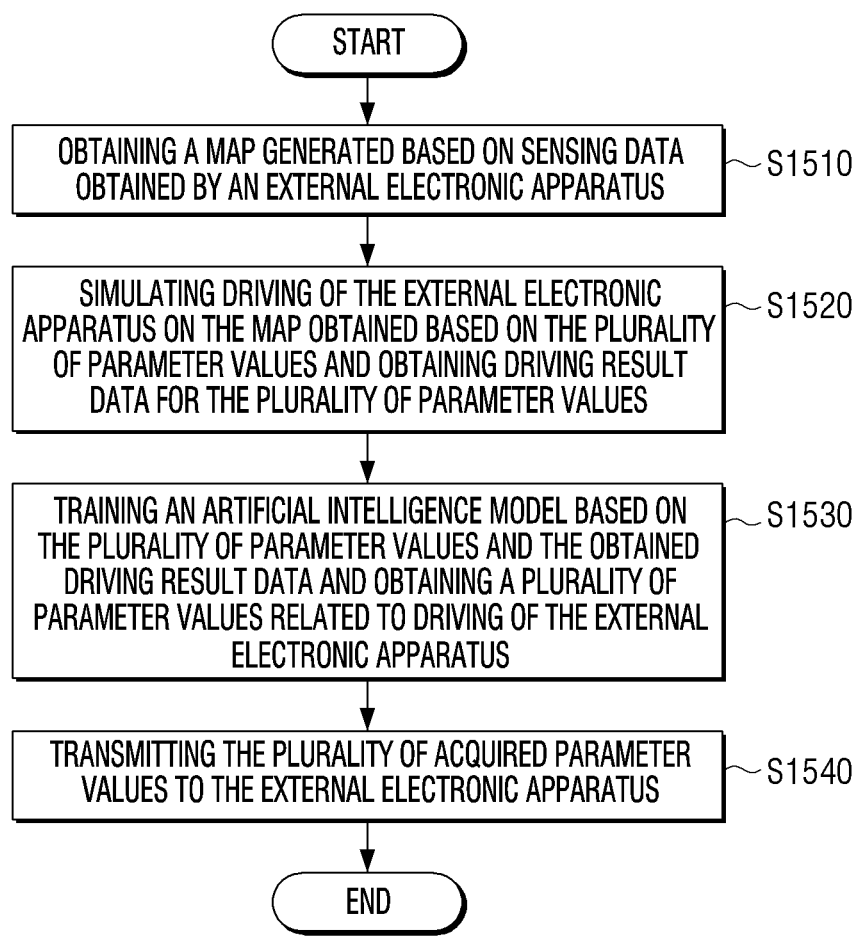
FIG. 15 is a flowchart illustrating an example method of controlling an electronic apparatus according to an embodiment of the disclosure.

FIG. 15 is a flowchart illustrating an example method of controlling an electronic apparatus according to an embodiment of the disclosure.

A map generated based on sensing data obtained by an external electronic apparatus is obtained at operation S1510.

In this case, sensing data obtained acquired by an external electronic apparatus is data that the external electronic apparatus obtained while running in a specific place, and at the operation S1510, when sensing data is received from an external electronic apparatus, a map corresponding to a specific place may be generated based on the received sensing data.

Driving of the external electronic apparatus is simulated on a map obtained based on a plurality of parameter values and driving result data for the plurality of parameter values is obtained at operation S1520.

An artificial intelligence model is trained based on the plurality of parameter values and the obtained driving result data and a plurality of parameter values related to driving of the external electronic apparatus is obtained at operation S1530.

The plurality of obtained parameter values are transmitted to the external electronic apparatus at operation S1540. In this case, sensing data obtained by the external electronic apparatus is applied to the driving algorithm of the external electronic apparatus controlling driving of the external electronic apparatus, and at the operation S1540, the plurality of obtained parameter values may be transmitted to the external electronic apparatus for updating the plurality of parameter values of the driving algorithm.

At operation S1520, when information on the driving algorithm of the external electronic apparatus is received from the external electronic apparatus, the plurality of parameters of the driving algorithm may be identified, and driving of the external electronic apparatus may be simulated on a map obtained based on the plurality of parameter values of the plurality of identified parameters.

At operation S1520, driving of the external electronic apparatus may be simulated on a map obtained based on a plurality of parameter sets respectively including a plurality of parameter values, and driving result data for each parameter set may be obtained, and an artificial intelligence model may be trained based on the plurality of parameter sets and the obtained driving result data and a plurality of parameter values related to driving of the external electronic apparatus may be obtained. The plurality of parameter sets may include a first parameter set and a second parameter set wherein parameter values of at least one parameter are different.

In this case, the artificial intelligence model may include a plurality of neural network layers, and in the plurality of neural network layers, weights included in each of the plurality of neural network layers may be trained based on the plurality of parameter sets and the driving result data obtained for each of the plurality of parameter sets, and at the operation S1530, as weights are trained, a plurality of parameter values related to driving of the external electronic apparatus may be obtained from an input layer among the plurality of neural network layers.

The driving result data may include at least one of the size of an area that a virtual object corresponding to the external electronic apparatus ran per unit time on the obtained map, the size of an area that the virtual object corresponding to the external electronic apparatus repeatedly ran on the obtained map, or the time that was taken for the virtual object corresponding to the external electronic apparatus to run an area of a predetermined size on the obtained map.

At operation S1520, driving of the virtual object corresponding to the external electronic apparatus may be simulated on the obtained map through the simulator stored in the electronic apparatus, and driving result data may thereby be obtained.

According to an embodiment of the disclosure, the aforementioned various embodiments may be implemented as software including instructions stored in machine-readable storage media, which can be read by machines (e.g.: computers). The machines may refer to apparatuses that call instructions stored in a storage medium, and can operate according to the called instructions, and the apparatuses may include the electronic apparatus (e.g.: an electronic apparatus A) according to the aforementioned embodiments. In case an instruction is executed by a processor, the processor may perform a function corresponding to the instruction by itself, or using other components under its control. An instruction may include a code generated by a compiler or a code executable by an interpreter. A storage medium that is readable by machines may be provided in the form of a non-transitory storage medium. The 'non-transitory' storage medium may not include signals, and is tangible, but does not indicate whether data is stored in the storage medium semi-permanently or temporarily.

According to an embodiment of the disclosure, the method according to the aforementioned various embodiments may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or through an application store (e.g., PlayStore™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g., a module or a program) may include a singular object or a plurality of objects. Also, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner Operations performed by a module, a program, or other components according to the various embodiments may be executed sequentially, in parallel, repetitively, or heuristically. Or, at least some of the operations may be executed in a different order or omitted, or other operations may be added.

While the disclosure has been illustrated and described with reference to vario us example embodiments thereof, it will be understood that the various embodiments are intended to be illustrative, not limiting. It will be further understood by one of ordinary skill in the art that various changes in form and detail may be made without departing from the true spirit and full scope of the disclosure, including the appended claims and equivalents thereof.

What is claimed is:

1. An electronic apparatus comprising:
   a communicator comprising communication circuitry;
   a memory storing information on an artificial intelligence model; and
   a processor configured to:
      obtain a map generated based on sensing data obtained by an external electronic apparatus,
      obtain driving result data for a plurality of first parameter values at least by simulating driving of the external electronic apparatus on the obtained map based on the plurality of parameter values,
      train the artificial intelligence model based on the plurality of first parameter values and the obtained driving result data and obtain a plurality of second parameter values related to driving of the external electronic apparatus, and
      control the communicator to transmit the plurality of second parameter values to the external electronic apparatus,
   wherein the processor is further configured to:
      simulate driving of the external electronic apparatus on the obtained map based on a plurality of parameter sets respectively including the plurality of first parameter values and a plurality of third parameter values and obtain driving result data for each parameter set,
      train the artificial intelligence model based on the plurality of parameter sets and the obtained driving result data and obtain the plurality of second parameter values related to driving of the external electronic apparatus, and
   wherein, the plurality of parameter sets include a first parameter set and a second parameter set in which parameter values of at least one parameter are different,
   wherein, the plurality of parameters comprises a parameter regarding an initial starting position of the electronic apparatus, a parameter regarding an initial speed of the electronic apparatus, a parameter regarding a rotating direction and a rotating angle during rotation of the electronic apparatus and a parameter regarding a degree of proximity to an obstacle, and a parameter regarding a degree of overlapping of driving paths in straight lines in opposite directions from each other during zig-zag driving.

2. The electronic apparatus of claim 1, wherein the sensing data obtained by the external electronic apparatus includes data obtained by the external electronic apparatus based on running in a specific place, and the processor is configured to: based on the sensing data being received from the external electronic apparatus through the communicator, generate the map corresponding to the specific place based on the received sensing data.

3. The electronic apparatus of claim 1, wherein the processor is configured to:
   based on information on a driving algorithm of the external electronic apparatus being received from the external electronic apparatus through the communicator, identify a plurality of parameters of the driving algorithm, and simulate driving of the external electronic apparatus on the obtained map based on the plurality of first parameter values of the plurality of identified parameters.

4. The electronic apparatus of claim 1, wherein the artificial intelligence model includes a plurality of neural network layers, and weights included in each of the plurality of neural network layers are configured to be trained based on the plurality of parameter sets and driving result data obtained for each of the plurality of parameter sets, and the processor is configured to: obtain a plurality of parameters related to driving of the external electronic apparatus from an input layer among the plurality of neural network layers based on the weights being trained.

5. The electronic apparatus of claim 1, wherein the driving result data includes at least one of a size of an area that an object corresponding to the external electronic apparatus ran per unit time on the obtained map, a size of an area that the object corresponding to the external electronic apparatus repeatedly ran on the obtained map, or a time taken for the object corresponding to the external electronic apparatus to run an area of a predetermined size on the obtained map.

6. A system comprising the electronic apparatus of claim 1 and the external electronic apparatus, wherein a driving algorithm of the external electronic apparatus is configured to apply the sensing data obtained by the external electronic apparatus to drive the external electronic apparatus, and the processor is configured to: control the communicator to transmit the plurality of obtained parameter values to the external electronic apparatus to update the plurality of parameter values of the driving algorithm.

7. The electronic apparatus of claim 1, wherein the map includes a plurality of sections,
wherein the processor is further configured to:
determine a section in which the electronic apparatus is located on the map,
determine a parameter set corresponding to the section in which the electronic apparatus is located on the map, from among a plurality of parameter sets received from the external electronic apparatus, and
set the plurality of first parameter values included in the parameter set corresponding to the section in which the electronic apparatus is located as the plurality of first parameter values of a driving algorithm.

8. The system of claim 6, wherein the external electronic apparatus is configured to:
simulate driving while changing the plurality of first parameter values in each of a plurality of sections included in the map and obtain driving result data for each section,
obtain a plurality of second parameter values for each section by training the artificial intelligence model using the plurality of first parameter values and the driving result data for each section, and
transmit the plurality of second parameter values for each of the plurality of sections to the external electronic apparatus.

9. A method for controlling an electronic apparatus, the method comprising:
obtaining a map generated based on sensing data obtained by an external electronic apparatus;
obtaining driving result data for a plurality of first parameter values at least by simulating a driving of the external electronic apparatus on the obtained map based on the plurality of parameter values;
training an artificial intelligence model based on the plurality of first parameter values and the obtained driving result data and obtaining a plurality of second parameter values related to driving of the external electronic apparatus; and
transmitting the plurality of second parameter values to the external electronic apparatus,
wherein obtaining the driving result data comprises;
simulating driving of the external electronic apparatus on the obtained map based on a plurality of parameter sets respectively including the plurality of first parameter values and a plurality of third parameter values and obtain driving result data for each parameter set,
wherein training the artificial intelligence model comprises;
training the artificial intelligence model based on the plurality of parameter sets and the obtained driving result data and obtain the plurality of second parameter values related to driving of the external electronic apparatus,
wherein, the plurality of parameter sets include a first parameter set and a second parameter set in which parameter values of at least one parameter are different, and
wherein the plurality of parameters comprises a parameter regarding an initial starting position of the electronic apparatus, a parameter regarding an initial speed of the electronic apparatus, a parameter regarding a rotating direction and a rotating angle during rotation of the electronic apparatus and a parameter regarding a degree of proximity to an obstacle, and a parameter regarding a degree of overlapping of driving paths in straight lines in opposite directions from each other during zig-zag driving.

10. The method of claim 9, wherein the sensing data obtained by the external electronic apparatus includes data obtained by the external electronic apparatus based on running in a specific place, and wherein the obtaining the map comprises: based on the sensing data being received from the external electronic apparatus, generating a map corresponding to the specific place based on the received sensing data.

11. The method of claim 9, wherein the obtaining driving result data comprises: based on information on a driving algorithm of the external electronic apparatus being received from the external electronic apparatus, identifying a plurality of parameters of the driving algorithm, and simulating driving of the external electronic apparatus on the obtained map based on the plurality of first parameter values of the plurality of identified parameters.

12. The method of claim 9, wherein the artificial intelligence model includes a plurality of neural network layers, and in the plurality of neural network layers, weights included in each of the plurality of neural network layers are trained based on the plurality of parameter sets and driving result data obtained for each of the plurality of parameter sets, and wherein the obtaining the plurality of parameter values comprises: obtaining a plurality of parameter values related to driving of the external electronic apparatus from an input layer among the plurality of neural network layers based on the weights being trained.

13. The method of claim 9, wherein the driving result data includes at least one of a size of an area that an object corresponding to the external electronic apparatus ran per unit time on the obtained map, a size of an area that the object corresponding to the external electronic apparatus repeatedly ran on the obtained map, or a time taken for the object corresponding to the external electronic apparatus to run an area of a predetermined size on the obtained map.

\* \* \* \* \*